(12) United States Patent
Okimoto et al.

(10) Patent No.: US 7,813,928 B2
(45) Date of Patent: Oct. 12, 2010

(54) SPEECH RECOGNITION DEVICE, SPEECH RECOGNITION METHOD, AND PROGRAM

(75) Inventors: Yoshiyuki Okimoto, Kyoto (JP); Tsuyoshi Inoue, Osaka (JP); Takashi Tsuzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 977 days.

(21) Appl. No.: 11/628,887

(22) PCT Filed: Jun. 2, 2005

(86) PCT No.: PCT/JP2005/010183
§ 371 (c)(1),
(2), (4) Date: Dec. 8, 2006

(87) PCT Pub. No.: WO2005/122144
PCT Pub. Date: Dec. 22, 2005

(65) Prior Publication Data
US 2008/0167872 A1    Jul. 10, 2008

(30) Foreign Application Priority Data
Jun. 10, 2004    (JP) .............................. 2004-173147

(51) Int. Cl.
*G10L 15/04* (2006.01)
(52) U.S. Cl. .................. 704/251; 704/231; 704/235; 704/236; 704/239; 704/255
(58) Field of Classification Search .............. 704/251, 704/231, 235, 236, 239, 255
See application file for complete search history.

(56) References Cited
U.S. PATENT DOCUMENTS
5,127,055 A * 6/1992 Larkey ........................ 704/244
(Continued)

FOREIGN PATENT DOCUMENTS
EP    1 376 536    1/2004
(Continued)

OTHER PUBLICATIONS

Koichi Tanigaki, Hirofumi Yamaoto, and Yoshinori Sagisaka, entitled "*Hierarchical Language Model Incorporating Probabilistic Description of Vocabulary in Classes*", The Transactions of the Institute of Electronics, Information and Communication Engineers, vol. J84-D-II, No. 11, Nov. 2001.

(Continued)

*Primary Examiner*—Qi Han
(74) *Attorney, Agent, or Firm*—Wenderoth, Lind & Ponack, L.L.P.

(57) ABSTRACT

A speech recognition device presenting whether a user's utterance is an unregistered word and whether the utterance should be repeated. The device includes a vocabulary storage unit (102) defining a vocabulary for speech recognition, and a speech recognition unit (101) checking the uttered speech against registered words. The device also includes a similarity calculation unit (103) calculating a similarity between the uttered speech and acoustic units, a judgment unit (104) judging, based on the check by the speech recognition unit (101) and the calculation performed by the similarity calculation unit (103), whether the uttered speech is a registered or unregistered word, an unregistered word unit (106) storing unregistered words, an unregistered word candidate search unit (105) searching the unregistered word unit (106) for unregistered word candidates, the, when the judgment unit (104) judges that the uttered speech is an unregistered word, and a display unit (107) displaying the result.

18 Claims, 16 Drawing Sheets

U.S. PATENT DOCUMENTS

| | | | |
|---|---|---|---|
| 5,432,886 | A | 7/1995 | Tsukada et al. |
| 6,195,641 | B1 * | 2/2001 | Loring et al. ............... 704/275 |
| 6,487,534 | B1 | 11/2002 | Thelen et al. |
| 7,653,541 | B2 * | 1/2010 | Ogawa ...................... 704/251 |
| 2001/0012994 | A1 * | 8/2001 | Komori et al. .............. 704/231 |
| 2004/0030552 | A1 | 2/2004 | Omote et al. |
| 2004/0167779 | A1 * | 8/2004 | Lucke et al. ................ 704/240 |

FOREIGN PATENT DOCUMENTS

| | | |
|---|---|---|
| JP | 6-282293 | 10/1994 |
| JP | 9-230889 | 9/1997 |
| JP | 2808906 | 7/1998 |
| JP | 2886117 | 2/1999 |
| JP | 2000-259645 | 9/2000 |
| JP | 2001-092494 | 4/2001 |
| JP | 2001-236089 | 8/2001 |
| JP | 2002-215670 | 8/2002 |
| JP | 2002-297179 | 10/2002 |
| JP | 2002-540479 | 11/2002 |
| JP | 2002-358095 | 12/2002 |
| JP | 2003-44091 | 2/2003 |
| JP | 3468572 | 9/2003 |
| WO | 00/58946 | 10/2000 |
| WO | 02/080141 | 10/2002 |

OTHER PUBLICATIONS

Hiroyuki Sakamoto and Shoichi Matsunaga, entitled "*Detection of Unregistered-Words Using Phoneme Cluster Models*" The Transactions of the Institute of Electronics, Information and Communication Engineers, vol. J80-D-II, No. 9, Sep. 1997.

* cited by examiner

FIG. 3

| Rank | Candidate | Similarity |
|---|---|---|
| 1st | Matsushita-Taro | 2041 |
| 2nd | Matsuda-Taichi | 1431 |
| 3rd | Kinoshita-Taro | 1322 |
| 4th | Yamashita-Taro | 1190 |
| 5th | Matsumoto-Ichiro | 1023 |
| ⋮ | ⋮ | ⋮ |

FIG. 4

| Reference similarity | Subword sequence |
|---|---|
| 2225 | ma-tsu-shi-ma-ka-no-u |

| Rank | Candidate | Similarity |
|---|---|---|
| 1st | Matsuda-Taichi | 1431 |
| 2nd | Kinoshita-Taro | 1322 |
| 3rd | Yamashita-Taro | 1190 |
| 4th | Matsumoto-Ichiro | 1023 |
| 5th | Yamashita-Jiro | 983 |
| ⋮ | ⋮ | ⋮ |

FIG. 7

| Reference similarity | Subword sequence |
|---|---|
| 2225 | ma-tsu-shi-ma-ka-no-u |

FIG. 8

| Rank | Candidate | Unregistered word score |
|---|---|---|
| 1st | Matsushita-Taro | 0.88 |
| 1st | Matsushita-Kazuo | 0.88 |
| 3rd | Matsushita-Tomoko | 0.85 |
| 3rd | Matsushima-Natsuko | 0.85 |
| 5th | Matsushima-Isao | 0.84 |
| ⋮ | ⋮ | ⋮ |

This week there is no TV program on which the following persons appear:

"Matsushita-Taro"
"Matsushita-Kazuo"
"Matsushita-Tomoko"
"Matsushima-Natsuko"
"Matsushima-Isao"

Return

FIG. 13

| Category | Contents |
|---|---|
| Proper title | Program title |
| Proper personal name | Entertainer name |
| Proper place name | Sightseeing spot name |
| Proper brand name | Brand name |
| ⋮ | ⋮ |

FIG. 17

| $C_{-2}$ | $C_{-1}$ | C | $P(C \mid C_{-2}, C_{-1})$ |
|---|---|---|---|
| <Unregistered proper program name> | <Case particle> | <Action "rokuga"> | 0.8 |
| <Unregistered proper program name> | <Case particle> | <Action "shutsuen"> | 0.1 |
| .. | .. | .. | .. |
| <Unregistered proper celebrity name> | <Case particle> | <Action "rokuga"> | 0.2 |
| <Unregistered proper celebrity name> | <Case particle> | <Action "shutsuen"> | 0.7 |
| .. | .. | .. | .. |

| C | W | $P(W \mid C)$ |
|---|---|---|
| <Action "rokuga"> | Rokuga | 0.35 |
| <Action "rokuga"> | Toru | 0.3 |
| .. | .. | .. |
| <Action "shutsuen"> | Shutsuen | 0.35 |
| <Action "shutsuen"> | Deru | 0.4 |
| .. | .. | .. |

This week the following TV programs will not be broadcasted:

"Taiyo-to-Tsuki"
"Taiyo-wo-Ute"
"Kage-wo-Utsu"
"Taiyo-Hitori"

Return

SPEECH RECOGNITION DEVICE, SPEECH RECOGNITION METHOD, AND PROGRAM

TECHNICAL FIELD

The present invention relates to a speech recognition device used for a man-machine interface based on speech recognition, and particularly to technology that responds to an utterance of an unregistered word.

BACKGROUND ART

Conventionally, it has been suggested to apply speech recognition technology to a user-friendly input front end for controlling a device. Generally in speech recognition, an approach is adopted in which uttered speech is compared with each of standard patterns of words defined in a speech recognition dictionary, with the most similar word pattern being regarded as a recognition result, as described in Non-patent Reference 1.

However, since the user of the device does not always remember all the words covered by speech recognition, he/she may utter a word not covered by speech recognition. Since, in such a case, the most similar word registered in the speech recognition dictionary is returned as a result under the above-mentioned basic framework of speech recognition, there is a problem in that this inevitably causes misrecognition of the utterance. To address this problem, a method for detecting a user's utterance of a word which is not included in the speech recognition dictionary (an unregistered word) has been designed.

For example, Patent Reference 1 describes a method in which the similarity between input speech and each word in the speech recognition dictionary is calculated, the similarity of each word is corrected based on the reference similarity calculated from a pattern which is a concatenation of unit standard patterns, and the user's utterance of the word is regarded as an unregistered word when the corrected similarity is less than a predetermined threshold value.

Patent Reference 2 describes a method for detecting an unregistered word with a small amount of processing and with high accuracy, using a phoneme Hidden Markov Model (HMM) and a Garbage HMM.

It can be easily conceived that when the user's utterance of an unregistered word is detected, a warning such as a beep is sounded to the user or a response such as "sore wa arimasen (it is not found)" by substituting the uttered word with a pronoun (it).

However, it is not enough for the user only to return such a response, because this response does not clearly indicate to the user whether his/her uttered word has not been recognized by chance or the word is an unregistered one.

Therefore, the user has no other choice but to accept such a situation or repeat the utterance with more attention to the pronunciation until giving up. This is a problem that decreases the convenience of controlling the device by voice input.

To address this problem, Patent Reference 3 describes a method for presenting, to the user, a list of words which can be accepted by the device depending on the situation, when the user's utterance of an unregistered word is detected. According to this method, even if the user has no idea about the words which can be recognized by the device, a list of words he/she can utter in the situation is presented every time he/she utters the unregistered word. Therefore, the user does not need to repeat the utterance of the same word over and over, and thus can make the device operate as he/she intends.

Patent Reference 4 describes a method in which speech recognition is performed using, as speech recognition dictionaries, both an internal dictionary corresponding to a conventional speech recognition dictionary and an external dictionary containing a lot of words which are regarded as unregistered in the conventional speech recognition dictionary, and when a recognition result is a word contained in the external dictionary, the fact that the word is an unregistered one is presented as well. According to this method, for example, when a user utters "Matsushita-Taro" under the situation where the word "Matsushita-Taro" is contained in the external dictionary, it is possible to return such a response as "Matsushita-Taro wa orimasen (Matsushita-Taro is not present)".

Patent Reference 1: Japanese Patent No. 2808906
Patent Reference 2: Japanese Patent No. 2886117
Patent Reference 3: Japanese Patent No. 3468572
Patent Reference 4: Japanese Laid-open Patent Application No. 09-230889
Non-patent Reference 1: Kiyohiro Shikano, Satoshi Nakamura, and Shiro Ise, "Digital Signal Processing Series 5: Speech/Acoustic Information Digital Signal Processing" Shoko-do, Nov. 10, 1997, pp. 45 and 53.

DISCLOSURE OF INVENTION

Problems that Invention is to Solve

However, the above-mentioned method of Patent Reference 3 necessitates the user to search for the intended word from among a significant number of acceptable words, and thus may cause the user to miss the word or put the burden on the user. For example, assuming that when the user carries out a personal name search to find out, from among acceptable words, a personal name "Matsushita-Taro" which is not present in the system by uttering the name, a list of one hundred names is displayed as searchable personal names. The user has to check whether or not "Matsushita-Taro" is included in the list, and whether or not an alternative personal name is included therein. In such a case, the user may miss the name "Matsushita-Taro". In addition, it is not only bothersome but also not easy to find out "Matsushita-Taro".

Furthermore, in order to return the above response in a satisfactory manner in the above-mentioned method of Patent Reference 4, a significant number of words have to be registered in the external dictionary as a dictionary for unregistered words. However, when speech recognition is performed using such a dictionary containing a large number of words, a conflicting problem occurs that misrecognition is likely to occur due to a lot of similar words registered. As a result, when a user utters, for example, "Matsushita-Taro", a response such as "Matsushita-Toru is not present" or "Matsushita-Toru, isn't it?" is returned. Such a response could cause a problem that the user falls into confusion unnecessarily or is forced to repeat his/her utterance.

So the present invention has been conceived in view of the above problems, and has an object to provide a speech recognition device which can reduce the situations where a user has to repeat his/her utterances in vain.

Means to Solve the Problems

In order to achieve the above object, the speech recognition device of the present invention is a speech recognition device that recognizes uttered speech and presents a result of the recognition, and includes: a speech recognition word storage unit which defines vocabulary for speech recognition and stores the vocabulary as registered words; a speech recognition unit which checks the uttered speech against the registered words stored in the speech recognition word storage unit; a reference similarity calculation unit which searches for a sequence with a highest similarity to the uttered speech, and calculates a reference similarity regarding the sequence, the sequence being a combination of acoustic units, which are subwords; an unregistered word judgment unit which judges whether the uttered speech is a registered word which is stored in the speech recognition word storage unit or an unregistered word which is not stored in the speech recognition word storage unit, by comparing a similarity between the registered words checked by the speech recognition unit and the uttered speech with the reference similarity calculated by the reference similarity calculation unit; an unregistered word storage unit which stores unregistered words; an unregistered word candidate search unit which searches for an unregistered word candidate that is likely to correspond to the uttered speech, based on the uttered speech, among the unregistered words stored in the unregistered word storage unit, in the case where the unregistered word judgment unit judges the uttered speech to be an unregistered word; and a result display unit which displays a result of the search together with an indication that the uttered speech is an unregistered word.

Here, the above-mentioned speech recognition device may further include a communication unit which communicates with an unregistered word server that stores unregistered words which are not stored in the unregistered word storage unit, and the unregistered words stored in the unregistered word storage unit may be updated when the communication unit receives the unregistered words from the unregistered word server.

Note that it is possible to embody the present invention not only as such a speech recognition device, but also as a speech recognition method including, as steps, the characteristic units of the speech recognition device, as well as a program for causing a computer to execute these steps. Furthermore, such a program can be distributed by recording media including CD-ROM and over transmission media including the Internet.

Effects of the Invention

According to the present invention, it is possible not only to present, to a user, his/her utterances of unregistered words which cause unsuccessful recognition of the utterances but also to present, to the user, in an easy-to-understand manner, that the presentation of unregistered words is not based on misrecognition.

In addition, the present invention does not decrease the recognition rate for utterances of words included in the speech recognition dictionary, which is the intended object thereof.

Furthermore, the unregistered word storage unit for searching candidates for an unregistered word is very large in size and requires constant maintenance. However, by separating this function, as a server, from the device, it is possible not only to reduce the manufacturing cost of the device but also to reduce the maintenance cost of the unregistered word storage unit.

BRIEF DESCRIPTION OF DRAWINGS

FIG. 3 is a diagram which shows an example of data outputted from the speech recognition unit in the first embodiment when recognizable vocabulary is uttered.

FIG. 4 is a diagram which shows an example of data outputted from the reference similarity calculation unit in the first embodiment when recognizable vocabulary is uttered.

FIG. 7 is a diagram which shows an example of data outputted from the reference similarity calculation unit in the first embodiment when an unregistered word is uttered.

FIG. 8 is a diagram which shows an example of data outputted from the unregistered word candidate search unit in the first embodiment when an unregistered word is uttered.

FIG. 13 is a diagram which shows an example of unregistered word categories in the second embodiment.

FIG. 17 is a diagram which shows an example of class N-gram language models for judging the class of an unregistered word in the second embodiment.

Figure 1:
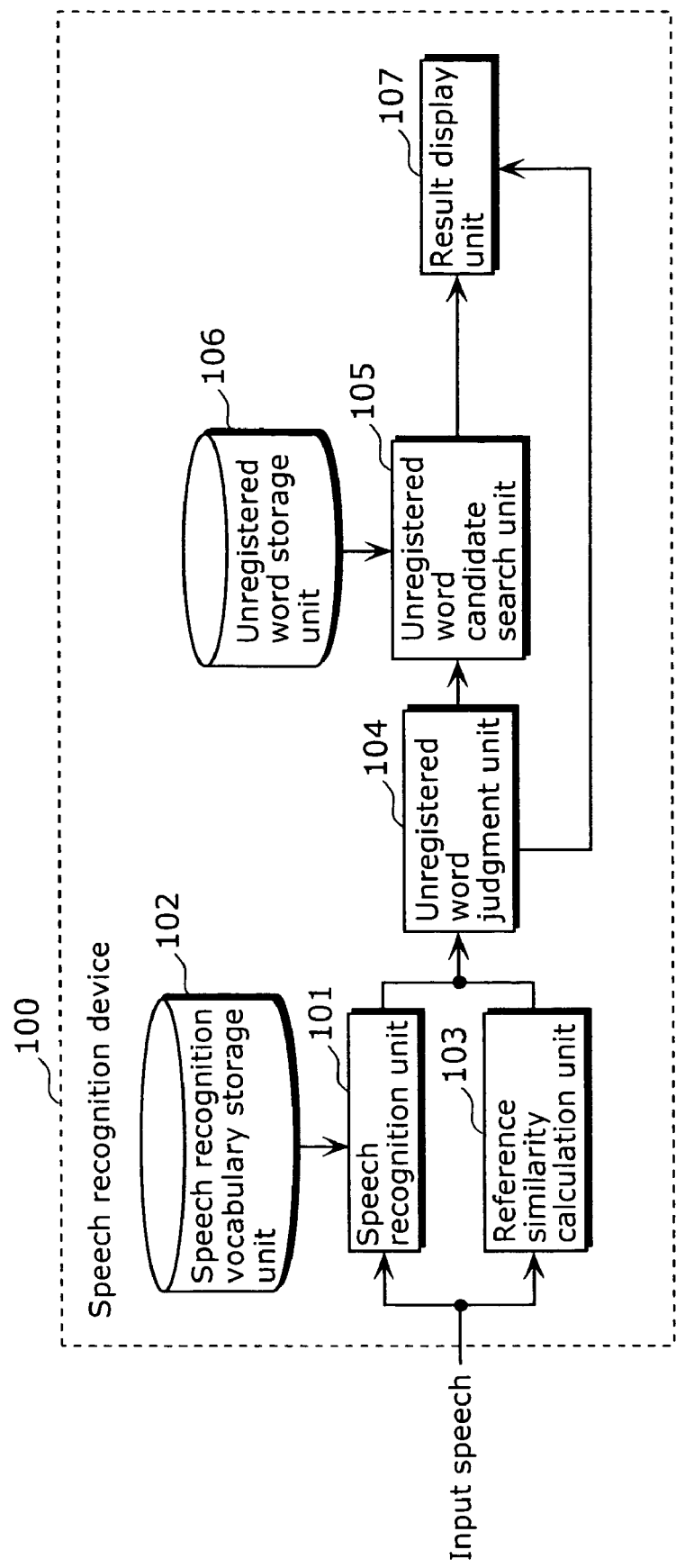
FIG. 1 is a block diagram which shows a functional structure of a speech recognition device in the first embodiment of the present invention.

NUMERICAL REFERENCES 100, 200, 300, 400 Speech recognition device
101 Speech recognition unit
102 Speech recognition vocabulary storage unit
103 Reference similarity calculation unit
104 Unregistered word judgment unit
105 Unregistered word candidate search unit
106, 301 Unregistered word storage unit 107 Result display unit
111 Speech fragment pattern storage unit
112 Word dictionary storage unit
113 Word matching unit
114 Transition probability storage unit
115 Speech sequence matching unit
116 Candidate score difference calculation unit
117 Candidate-phoneme sequence similarity calculation unit
118 Candidate-speech sequence score difference calculation unit
119 Candidate-speech sequence-phoneme sequence similarity calculation unit
201, 201a, 201b Unregistered word class judgment unit
202 By-class unregistered word storage unit
211 Word string hypothesis generation unit
221 Class N-gram generation/accumulation unit
222 Sentence corpus accumulation unit
223 Sentence morphemic analysis unit
224 Class N-gram generation unit
225 Class N-gram accumulation unit
231 Class-dependent word N-gram generation/accumulation unit
232 Class corpus accumulation unit
233 Class morphemic analysis unit
234 Class-dependent word N-gram generation unit
235 Class-dependent word N-gram accumulation unit
236 Unregistered word class definition generation unit
237 Unregistered word class definition accumulation unit
241 Word category information receiving unit
242 Unregistered word class determination unit
302, 402 Network (Communication means)
303 Unregistered word server
401 Unregistered word search request sending/receiving unit
403 Unregistered word search server
404 Unregistered word search unit
405 Unregistered word storage unit

BEST MODE FOR CARRYING OUT THE INVENTION

In order to achieve the above object, the speech recognition device of the present invention is a speech recognition device that recognizes uttered speech and presents a result of the recognition, and includes: a speech recognition word storage unit which defines vocabulary for speech recognition and stores the vocabulary as registered words; a speech recognition unit which checks the uttered speech against the registered words stored in the speech recognition word storage unit; a reference similarity calculation unit which searches for a sequence with a highest similarity to the uttered speech, and calculates a reference similarity regarding the sequence, the sequence being a combination of acoustic units, which are subwords; an unregistered word judgment unit which judges whether the uttered speech is a registered word which is stored in the speech recognition word storage unit or an unregistered word which is not stored in the speech recognition word storage unit, by comparing a similarity between the registered words checked by the speech recognition unit and the uttered speech with the reference similarity calculated by the reference similarity calculation unit; an unregistered word storage unit which stores unregistered words; an unregistered word candidate search unit which searches for an unregistered word candidate that is likely to correspond to the uttered speech, based on the uttered speech, among the unregistered words stored in the unregistered word storage unit, in the case where the unregistered word judgment unit judges the uttered speech to be an unregistered word; and a result display unit which displays a result of the search together with an indication that the uttered search speech is an unregistered word.

With this structure, if a word uttered by a user is an unregistered word, the device searches for and presents the candidates for the unregistered word. Therefore, the user can know that his/her uttered word is an unregistered one just by confirming that the word is included in the unregistered word candidates. In addition, since the search of the unregistered word candidates is carried out separately from the comparison with the words in the speech recognition dictionary, the performance of speech recognition itself does not decrease.

Here, the unregistered word candidate search unit may search for plural unregistered word candidates among the unregistered words stored in the unregistered word storage unit.

With this structure, the device does not narrow down unregistered word candidates to only one word. Therefore, a highly accurate search of unregistered word candidates is not required, and thus only small hardware resources are needed.

It is preferable that the unregistered word storage unit stores the unregistered words according to categories into which the unregistered words are classified. It is more preferable that the above-mentioned speech recognition device further includes an unregistered word class judgment unit which judges a category of the unregistered word based on the uttered speech, and that the unregistered word candidate search unit searches for the unregistered word candidates among the categories into which the unregistered words are classified in the unregistered word storage unit, based on a result of the judgment by the unregistered word class judgment unit.

By doing so, the device narrows down the search range for unregistered word candidates according to the categories of the unregistered words. Therefore, it is possible to prevent a word belonging to a user-unintended category from being presented as an unregistered word candidate. In addition, narrowing down of the search range allows improvement in the accuracy of searching for unregistered word candidates.

The above-mentioned speech recognition device may further include an information acquisition unit operable to acquire information regarding the categories, and the unregistered word candidate search unit may search for the unregistered word candidates among the categories into which the unregistered words are classified in the unregistered word storage unit, based on the information acquired by the information acquisition unit.

With this structure, the device does not output the unregistered word candidates which are similar in pronunciation but are unlikely to be uttered in view of the situation. Therefore, it is possible to realize a speech recognition device which reduces the number of unregistered word candidates to be presented and presents the candidates to the user in an easy-to-understand manner.

Furthermore, it is preferable that the unregistered word candidate search unit searches for the unregistered word candidate by calculating an unregistered word score indicating a degree of similarity to the uttered speech, that the result display unit displays the unregistered word candidate and the calculated unregistered word score, as the result of the search, and that the result display unit changes the display of the unregistered word candidate according to the calculated unregistered word score.

By doing so, the unregistered word candidates are represented in numerical form and the likely candidate is highlighted in the presentation. Therefore, this structure produces an effect that the unregistered word candidates can be presented to the user in an easy-to-understand manner.

The unregistered words stored in the unregistered word storage unit may be updated under a predetermined condition.

By doing so, it is possible to quickly incorporate ever-increasing unregistered words such as proper personal names and TV program titles into the unregistered word storage unit.

Here, the above-mentioned speech recognition device may further include a communication unit which communicates with an unregistered word server that stores unregistered words which are not stored in the unregistered word storage unit, and the unregistered words stored in the unregistered word storage unit may be updated when the communication unit receives the unregistered words from the unregistered word server.

By doing so, new unregistered words are provided from the external server. Therefore, it is possible to keep the unregistered word storage unit in the best condition without bothering the user to register ever-increasing unregistered words, such as proper personal names and TV program titles, into the unregistered word storage unit.

The registered words stored in the speech recognition word storage unit may be updated under a predetermined condition.

By doing so, it is possible to store only a relatively small number of registered words which are likely to be used frequently into the speech recognition word storage unit, according to the change in time of the usage frequency of the registered words. Therefore, the recognition time is reduced and thus the high recognition rate can easily be achieved.

It is possible to embody the present invention not only as such a speech recognition device but also as a speech recognition system. More specifically, the system may be a speech recognition system for recognizing uttered speech and presenting a result of the recognition, including: a speech recognition device that recognizes uttered speech; and an unregistered word search server that searches for an unregistered word which is not stored in the speech recognition device. In such a system, the speech recognition device may include: a speech recognition word storage unit which defines vocabulary for speech recognition and stores the vocabulary as registered words; a speech recognition unit which checks the uttered speech against the registered words stored in the speech recognition word storage unit; a reference similarity calculation unit which searches for a sequence with a highest similarity to the uttered speech, and calculates a reference similarity regarding the sequence, the sequence being a combination of acoustic units, which are subwords; an unregistered word judgment unit which judges whether the uttered speech is a registered word which is stored in the speech recognition word storage unit or an unregistered word which is not stored in the speech recognition word storage unit, by comparing a similarity between the registered words checked by the speech recognition unit and the uttered speech with the reference similarity calculated by the reference similarity calculation unit; a search request sending unit which sends, to the unregistered word search server, a search request to search for an unregistered word candidate that is likely to correspond to the uttered speech, in the case where the unregistered word judgment unit judges the uttered speech to be an unregistered word; a search result receiving unit which acquires a result of the search for the unregistered word candidate from the unregistered word search server; and a result display unit displays a result of the search together with an indication that the uttered speech is an unregistered word, and the unregistered word search server may include: an unregistered word storage unit which stores unregistered words; a search request receiving unit which receives the search request from the search request sending unit; an unregistered word candidate search unit which searches for an unregistered word candidate that is likely to correspond to the uttered speech, based on the uttered speech, among the unregistered words stored in the unregistered word storage unit, in the case where the search request receiving unit receives the search request; and a search result sending unit which sends the result of the search to the speech recognition device.

With this structure, it is possible not only to achieve a compact speech recognition interface, but also to produce an effect that the maintenance cost of the unregistered word storage unit can be reduced. It is also possible to integrate plural unregistered word storage units, which need to be constantly updated, into one unit for plural devices, and thus the maintenance cost thereof can be reduced.

Note that it is possible to embody the present invention not only as such a speech recognition device, but also as a speech recognition method including, as steps, the characteristic units of the speech recognition device, as well as a program for causing a computer to execute these steps. Furthermore, such a program can be distributed by recording media including CD-ROM and over transmission media including the Internet.

Hereafter, the best mode for carrying out the present invention shall be described in detail with reference to FIG. 1 through FIG. 21.

First Embodiment

FIG. 1 is a block diagram which shows a functional structure of a speech recognition device in the first embodiment of the present invention.

A speech recognition unit 100 shown in FIG. 1 is a device which is used as one of the man-machine interfaces and which accepts speech inputted from a user and outputs the recognition result of the inputted speech. It includes a speech recognition unit 101, a speech recognition vocabulary storage unit 102, a reference similarity calculation unit 103, an unregistered word judgment unit 104, an unregistered word candidate search unit 105, an unregistered word storage unit 106, and a result display unit 107.

The speech recognition unit 101 is a processing unit which receives input speech and recognizes the contents of the speech.

The speech recognition vocabulary storage unit 102 is a storage device such as a hard disk or the like which defines and stores vocabulary to be recognized by the speech recognition unit 101. This speech recognition vocabulary storage unit 102 stores the standard acoustic pattern of each word as a standard pattern, or that represented by a model such as a Hidden Markov Model (HMM) or a Neural Net Model. Or, this speech recognition vocabulary storage unit 102 stores the standard pattern of each shorter acoustic unit as a standard pattern, or that represented by a model such as a HMM and a Neural Net Model, and for speech recognition, it synthesizes the word pattern and word model for each word and provides the result to the speech recognition unit 101.

The reference similarity calculation unit 103 is a processing unit which calculates a reference similarity used for judging whether or not input speech is an unregistered word. Using an arbitrary combination of patterns and models of acoustic units called subwords which are the shorter units than words, this reference similarity calculation unit 103 searches for a sequence of subwords with the highest similarity to the input speech so as to obtain that highest similarity.

The unregistered word judgment unit 104 judges whether or not the user's utterance is an unregistered word based on the results from the speech recognition unit 101 and the reference similarity calculation unit 103. In the case where the user's utterance is a word stored in the speech recognition vocabulary storage unit 102, namely a registered word, the unregistered word judgment unit 104 outputs, to the result display unit 107, the recognition result that it has recognized the utterance. In the case where the user's utterance is a word which is not stored in the speech recognition vocabulary storage unit 102, namely, an unregistered word, the unregistered word judgment unit 104 outputs, to the unregistered word candidate search unit 105, the recognition result that the utterance is an unregistered word.

The unregistered word candidate search unit 105 is a processing unit which searches for an unregistered word based on the user's utterance when it is judged to be an unregistered word.

The unregistered word storage unit 106 is a storage device such as a hard disk or the like which stores a lot of words to be searched as unregistered words by the unregistered word candidate search unit 105.

Since it is assumed that the unregistered word candidate search unit 105 searches for an unregistered word in a large amount of vocabulary stored in the unregistered word storage unit 106, it is preferable to do a search using a simpler and more speedy method (which requires a shorter calculation time).

The result display unit 107 is a display device such as a CRT display, a liquid crystal display or the like, which displays a screen showing the recognition result outputted from the unregistered word judgment unit 104 and a screen showing the judgment result and the search result of an unregistered word so as to present to the user whether the user's utterance has been recognized or not and whether it is an unregistered word or not.

Next, a description is given as to the operations of the speech recognition device 100 structured as mentioned above.

Figure 2:
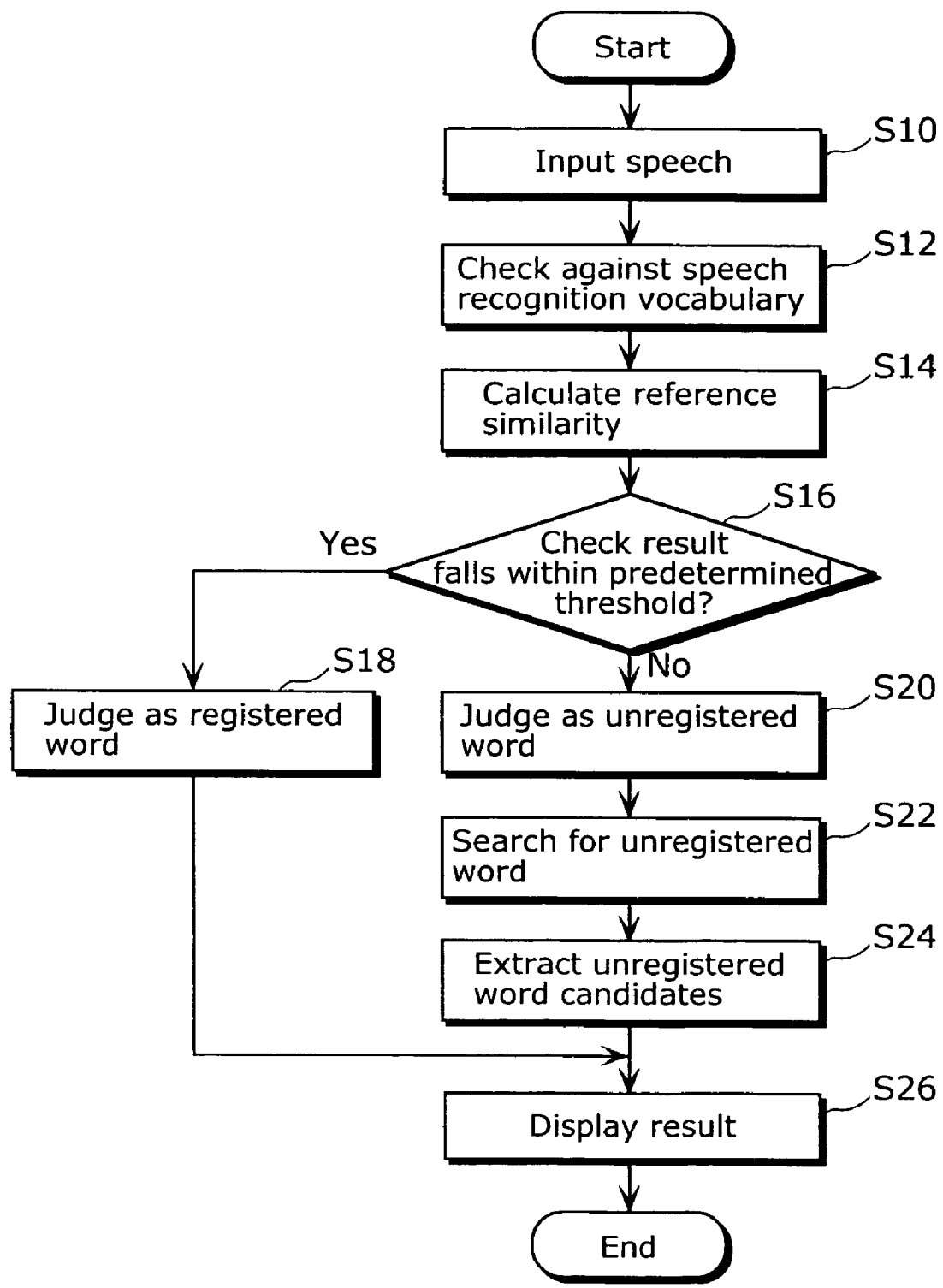
FIG. 2 is a flowchart which shows operations of the speech recognition device in the first embodiment.

FIG. 2 is a flowchart which shows a sequence of operations of the speech recognition device 100.

First, when accepting an input of user's uttered speech (S10), the speech recognition unit 101 of the speech recognition device 100 recognizes a word similar to the input speech from among the words stored in the speech recognition vocabulary storage unit 102 based on the input speech (S12). More specifically, the speech recognition unit 101 calculates the similarity between each word and the input speech by checking the input speech against the standard pattern or the word model of each word stored in the speech recognition vocabulary storage unit 102, and extracts the words with high similarities as candidates. At the same time, the reference similarity calculation unit 103 in the speech recognition device 100 searches for a subword sequence which is most similar to the input speech so as to obtain the similarity of the sequence as a reference similarity (S14).

Next, the unregistered word judgment unit 104 in the speech recognition device 100 compares the similarity of the top-ranked candidate word (the word with the highest similarity) obtained by the speech recognition unit 101 with the reference similarity obtained by the reference similarity calculation unit 103, and judges whether or not the comparison result falls within a predetermined threshold value (S16). This predetermined threshold value is a value for judging whether the user's utterance is a registered word or an unregistered one. The optimal threshold value is determined based on the statistical distribution of similarities obtained by the speech recognition unit 101 and the reference similarity calculation unit 103 using a lot of speech samples of uttered registered words and a lot of speech samples of uttered unregistered words.

Here, in the case where the comparison result of the similarity of the top-ranked word candidate obtained by the speech recognition unit 101 and the reference similarity obtained by the reference similarity calculation unit 103 falls within the statistically predetermined threshold value (Yes in S16), the unregistered word judgment unit 104 judges that the user's utterance is a word included in the speech recognition vocabulary storage unit 102 (a registered word) (S18). After that, the speech recognition unit 100 presents the recognition result to the user via the result display unit 107 (S26), and ends the processing operation.

On the other hand, in the case where the comparison result of the similarity of the top-ranked word candidate obtained by the speech recognition unit 101 and the reference similarity obtained by the reference similarity calculation unit 103 exceeds the statistically predetermined threshold value (No in S16), the unregistered word judgment unit 104 judges that the user's utterance is a word which is not included in the speech recognition vocabulary storage unit 102 (an unregistered word) (S20), and outputs the judgment result to the unregistered word candidate search unit 105.

When the unregistered word judgment unit 104 judges that the user's utterance is an unregistered word, the unregistered word candidate search unit 105 in the speech recognition device 100 searches for the unregistered word based on the utterance (S22). The unregistered word candidate search unit 105 compares the subword sequence obtained by the reference similarity calculation unit 103 with each of a lot of unregistered words stored in the unregistered word storage unit 106 so as to obtain the unregistered word score which is a score associated with the similarity, and thereby searches for the unregistered word with a high score, namely, the unregistered word which is likely to be the user's utterance. Then, the unregistered word candidate search unit 105 extracts a number of unregistered word candidates which are likely to be the user's utterance, for example, in descending order of scores (S24), and outputs the extracted unregistered word candidates and their unregistered word scores to the result display unit 107. After that, the speech recognition device 100 presents, via the result display unit 107, the judgment result, the extracted unregistered word candidates and their unregistered word scores to the user (S26), and ends the processing operation.

Incidentally, the speech recognition device 100 defines words to be recognized, namely, speech recognition vocabulary, depending on the application that uses the speech recognition device 100 as an input device of a man-machine interface. For example, in the case of an application that does a TV program search using speech recognition as an input means, TV program titles to be searched and the names of the cast which are the search keys are defined as speech recognition vocabulary.

On the assumption of such an application, the speech recognition device 100 displays different screens based on whether or not the user's utterance is a word included in the speech recognition vocabulary storage unit 102.

More specifically, in the case where the utterance is a word included in the speech recognition vocabulary storage unit 102, the speech recognition unit 101 checks the input speech against the standard pattern or the word model of each word stored in the recognition vocabulary storage unit 102, calculates the similarity of each word to obtain the candidates in descending order of similarities, and outputs the candidates to the result display unit 107.

As a specific example, FIG. 3 shows a case where a user utters "Matsushita-Taro" when it is assumed that the word "Matsushita-Taro" is included in the speech recognition vocabulary storage unit 102. At the same time, the reference similarity calculation unit 103 searches for the subword sequence which is most similar to the input speech so as to obtain that similarity as a reference similarity.

FIG. 4 shows an example of the output from the reference similarity calculation unit 103 in response to the user's utterance of "Matsushita-Taro".

Figures 5, 6:
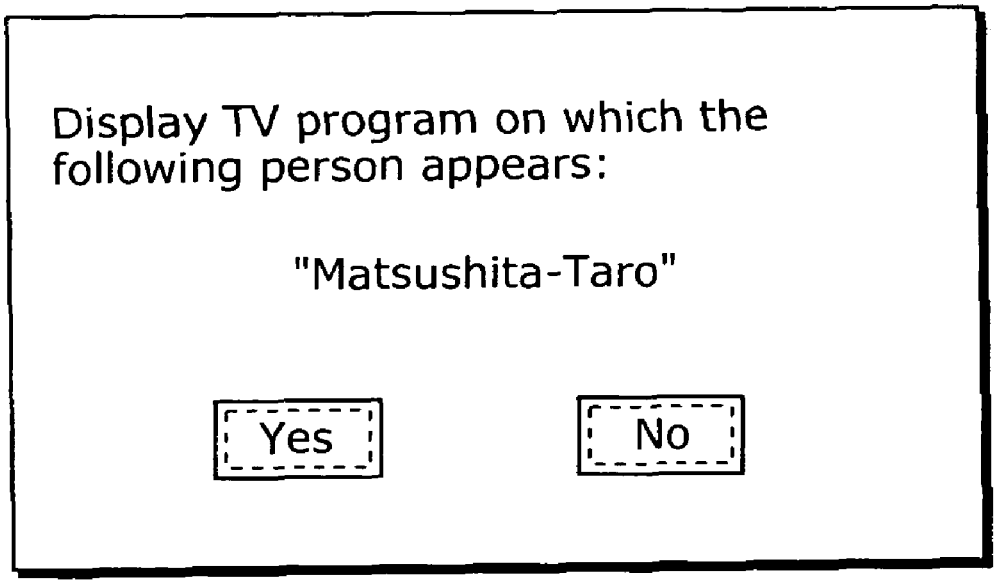
FIG. 5 is a diagram which shows an example of a recognition result displayed in the first embodiment when recognizable vocabulary is uttered.
FIG. 6 is a diagram which shows an example of data outputted from the speech recognition unit in the first embodiment when an unregistered word is uttered.

In the examples shown in FIG. 3 and FIG. 4, since the difference between the similarity "2041" of the top-ranked candidate and the reference similarity "2225" is smaller than a statistically predetermined threshold value (for example, "2000"), the unregistered word judgment unit 104 judges that the user's utterance is a registered word. Since the utterance is not an unregistered word, the unregistered word candidate search unit 105 does not search for an unregistered word but outputs the recognition result as it is to the result display unit 107. Therefore, "Matsushita-Taro" is correctly displayed as a recognition result. FIG. 5 shows an example of the result display by the result display unit 107.

The user sees the recognition result in a form as illustrated in FIG. 5 and recognizes at a glance that his/her own utterance is a registered word.

On the other hand, even in the case where the user's utterance is a word which is not included in the speech recognition vocabulary storage unit 102, the speech recognition unit 101 checks the word against each word stored in the speech recognition vocabulary storage unit 102 to obtain the similarity of each word, and outputs the candidates in descending order of similarities. However, since the utterance is a word which is not included in the speech recognition vocabulary in this case, there is no word in these candidates that matches the utterance. Therefore, the output example in this case is as shown in FIG. 6. The display shows here that although the user's utterance is "Matsushita-Taro" as is the case with the above, the speech recognition vocabulary storage unit 102 does not contain the word "Matsushita-Taro".

At the same time as the above output, the reference similarity calculation unit 103 searches for the subword sequence which is most similar to the input speech and calculates its similarity. This operation is not affected at all by whether or not the utterance is included in the speech recognition vocabulary. As a result, the output from the reference similarity calculation unit 103 is, as shown in FIG. 7, the same as the example (in FIG. 4) outputted in the case where the utterance is included in the speech recognition vocabulary.

Next, the unregistered word judgment unit 104 compares the similarity of the top-ranked candidate obtained by the speech recognition unit 101 with the reference similarity obtained by the reference similarity calculation unit 103, as described above. If the utterance is not included in the speech recognition vocabulary, their similarities differ significantly from each other and the difference between them exceeds the predetermined threshold value. Therefore, the unregistered word judgment unit 104 judges, based on this difference, that the utterance is an unregistered word. In the examples shown in FIG. 6 and FIG. 7, since the difference between the similarity "1431" of the top-ranked candidate and the reference similarity "2225" is significantly different from each other and is greater than the predetermined threshold value (for example, "2000"), the unregistered word judgment unit 104 judges that the user's utterance is an unregistered word.

When the unregistered word judgment unit 104 judges that the user's utterance is an unregistered word, the unregistered word candidate search unit 105 compares the subword sequence obtained by the reference similarity calculation unit 103 with each of a lot of unregistered words stored in the unregistered word storage unit 106 so as to calculate the unregistered word score which is a score associated with the similarity. Then, the unregistered word candidate search unit 105 extracts five candidates from among the unregistered words in descending order of unregistered word scores, and outputs the candidates and their unregistered word scores to the result display unit 107.

FIG. 8 is a diagram which shows an example of a search result of unregistered words obtained when the unregistered word candidate search unit 105 carries out the search based on the subword sequence "ma-tsu-shi-ma-ka-no-u" obtained by the reference similarity calculation unit 103, upon accepting the user's utterance of "Matsushita-Taro". It is assumed here that "Matsushita-Taro" is stored in the unregistered word storage unit 106.

Figures 9, 10:
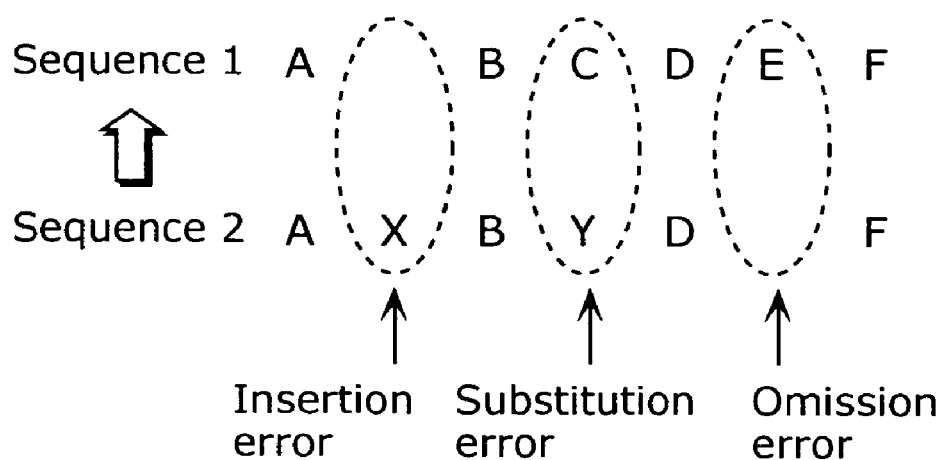
FIG. 9 is a diagram which shows an example of a recognition result displayed in the first embodiment when an unregistered word is uttered.
FIG. 10 is a diagram which shows a method of calculating a phoneme sequence similarity in the first embodiment when an unregistered word is searched.

As described above, the result of the search carried by the unregistered word candidate search unit 105 is transmitted to the result display unit 107, together with the information indicating that this word is unregistered one, and thus the user is informed that his/her utterance has been recognized as an unregistered word. In the example shown in FIG. 8, the result shown in FIG. 9 is outputted. The user sees the recognition result in a form as illustrated in FIG. 9 and recognizes at a glance that his/her own utterance is unknown to the system.

In this type of display of the result, the user's utterance is displayed on a screen. Therefore, the user can clearly know that his/her own utterance has been recognized correctly but is not included in the speech recognition vocabulary, without doubting whether the utterance has been recognized correctly.

In addition, in this type of display of the result, a number of words are displayed as unregistered word candidates. Therefore, the user has to search for his/her uttered word. However, if a small number of candidates are outputted, the user does not have to do much with the search. In addition, this type of display of unregistered word candidates is intended to imply that no further processing can be performed on these displayed words because they are unregistered ones. Therefore, it saves the user the trouble of selecting his/her own utterance from among a number of unregistered word candidates. Consequently, it can be said that the display of a number of unregistered word candidates has very few disadvantages.

Seen from the viewpoint of implementation of a speech recognition system, the fact that there is no need to narrow down unregistered word candidates to one means that the unregistered word candidate search unit 105 is not required to do a highly accurate search, and thus only small resources are required for achieving such search accuracy. These can be great advantages. In addition, even if the search accuracy is not so high, the word uttered by the user is likely to be included in a number of displayed candidates. Therefore, it is highly practical for the user to realize that it is useless to utter the word over and over because it is an unregistered one.

A more specific description is given below as to the operations of the unregistered word candidate search unit 105.

The unregistered word candidate search unit 105 in the first embodiment employs a value based on a phoneme edit distance as a search method of unregistered word candidates.

In this search method, assuming that two words are each represented by a sequence of phoneme symbols, the sequence of phoneme symbols of one word is edited to be rewritten into the sequence of the other word, how many steps of change are needed is counted.

FIG. 10 shows one example of this method. FIG. 10 shows a sequence of phoneme symbols "ABCDEF" (sequence 1)

and a sequence of phoneme symbols "AXBYDF" (sequence 2). It also indicates that the steps required for rewriting the sequence 2 into the sequence 1 are the following editing steps: one insertion (insertion error), one substitution (substitution error) and one deletion (omission error). In other words, in the example shown in FIG. 10, the edit distance required for rewriting the sequence 2 into the sequence 1 is 3 (1 insertion+1 substitution+1 deletion).

The unregistered word candidate search unit 105 calculates the edit distance, as mentioned above, between the subword sequence obtained by the reference similarity calculation unit 103, represented as a sequence of phoneme symbols, and the sequence of phoneme symbols of each word stored in the unregistered word storage unit 106, normalizes it, and subtracts 1 from the normalized value of the edit distance so as to obtain the unregistered word score. The unregistered word candidate search unit 105 performs this processing on all of the words stored in the unregistered word storage unit 106 so as to extract, as unregistered word candidates, the words in descending order of unregistered word scores, and output them to the result display unit 10. FIG. 8 above shows an example of the unregistered word candidates and their unregistered word scores obtained as mentioned above.

The benefit of this unregistered word search method based on the comparison between phoneme sequences lies in that a full search is conducted within the unregistered word storage unit 106, which stores a significant number of words, with a simple process, thus allowing small calculation resources (such as calculation time, and memory capacity, processor load and consumed power required for calculation, and the like) required for searching for unregistered words. With this benefit, it is possible even for a device which often has only limited calculation resources, such as a mobile information terminal device, to search and display unregistered word candidates in a short time, thus giving the user simple and smooth usability.

On the other hand, there is a concern that a simple search could cause a decrease in the search accuracy. However, since plural unregistered word candidates can be outputted, as mentioned above, such output of plural candidates with high scores can enhance the probability that the user's utterance is included in the candidates, thus offsetting the decrease in the search accuracy. In addition, since the unregistered word search is carried out separately from the speech recognition unit 101, there is an effect that this search has no adverse effect on the recognition processing in the speech recognition unit 101.

In the first embodiment, the reference similarity calculation unit 103 is provided in order to make a judgment of unregistered words. It should be noted, however, that this unit is not essential element to the present invention and other methods for judging unregistered words can be used in such a manner that a Garbage model is added to an acoustic model.

Figure 11:
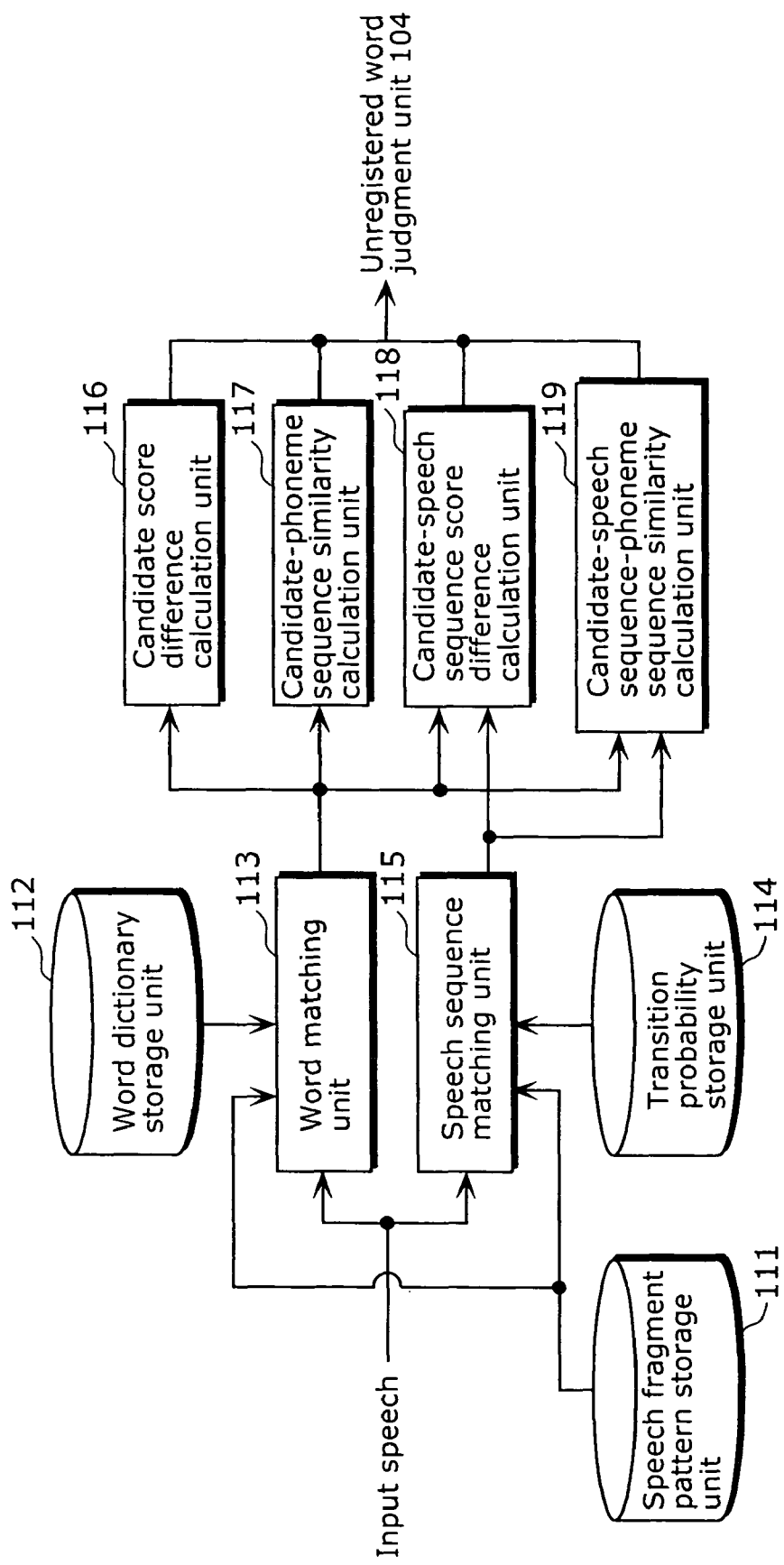
FIG. 11 is a block diagram which shows a functional structure of an unknown utterance detection device.

In addition, instead of the speech recognition unit 101, the speech recognition vocabulary storage unit 102 and the reference similarity calculation unit 103 which are described in the first embodiment, an unknown utterance detection device as shown in FIG. 11 can be used.

FIG. 11 is a block diagram which shows a functional structure of the unknown utterance detection device.

The speech fragment pattern storage unit 111 stores fragments of standard speech used for matching with the characteristic parameters of input speech.

Here, a speech fragment denotes a set of a VC pattern which is a concatenation of the latter part of a vowel section of speech and the first part of the following consonant section and a CV pattern which is a concatenation of the latter part of a consonant section and the first part of the following vowel section. However, a speech fragment may be a set of phonemes each corresponding approximately to one alphabetical letter when a Japanese word is represented in Roman letters, a set of moras each corresponding approximately to one hiragana letter when a Japanese word is represented in hiragana letters, a set of subwords each representing a chain of moras, or a mixture of these sets.

The word dictionary storage unit 112 stores the rules for creating word patterns of speech recognition vocabulary by concatenating the above speech fragments.

The word matching unit 113 compares input speech represented as a temporal sequence of characteristic parameters with each created word pattern so as to obtain the likelihood corresponding to the similarity of each word.

The transition probability storage unit 114 stores a transition probability which represents, as continuous values, the naturalness of an arbitrary concatenation of speech fragments. A 2-gram probability of phonemes is used here as a transition probability. A 2-gram probability of phonemes is a probability $P(y|x)$ that a phoneme y follows a preceding phoneme x, and is previously calculated using a lot of Japanese text data and the like. It should be noted, however, that the transition probability may be any other probability such as a 2-gram probability of moras, a 2-gram probability of subwords, a 2-gram probability of a mixture of moras and subwords, and the like. Or, it may be a 3-gram probability instead of a 2-gram probability.

The speech sequence matching unit 115 calculates the pattern obtained by arbitrarily concatenating the above speech fragment patterns and the likelihood of the input speech represented as a temporal sequence of the characteristic parameters, in view of the above transition probability, and determines the obtained likelihood to be the maximum likelihood.

The candidate score difference calculation unit 116 normalizes the difference between the likelihood of the word with the highest value (top-ranked candidate) and the likelihood of the word with the second highest value (second-ranked candidate) among respective likelihood values of words calculated by the word matching unit 113, using the lengths of these words, so as to calculate the normalized difference.

The candidate-phoneme sequence similarity calculation unit 117 calculates the distance between the phoneme sequence of the top-ranked candidate and the phoneme sequence of the second-ranked candidate in order to obtain the acoustic similarity between them.

The candidate-speech sequence score difference calculation unit 118 normalizes the difference between the likelihood of the top-ranked candidate and the reference likelihood calculated by the speech sequence matching unit 115 using the lengths of the words, so as to calculate the normalized difference.

The candidate-speech sequence-phoneme sequence similarity calculation unit 119 calculates the acoustic similarity between the top-ranked candidate and the sequence which is judged to be the optimal sequence by the speech sequence matching unit 115, as a difference between respective phoneme sequences.

Assuming that such an unknown utterance detection device is used, the unregistered word judgment unit 104 judges whether or not the input speech is an unregistered word by considering all the values calculated by the candidate score difference calculation unit 116, the candidate-phoneme sequence similarity calculation unit 117, the candidate-speech sequence score difference calculation unit 118 and the candidate-speech sequence-phoneme sequence similarity calculation unit 119 respectively. This judgment carried out based on a statistical combination of various measures for detecting a number of unregistered words improves the accuracy of judging the unregistered words. Four measures are shown here as measures used by the unregistered word judgment unit 104. However, it is also possible to use, in combination with these four measures, the likelihood itself of each word candidate, its distribution, variations of a local score within a word section, information regarding the duration of a phoneme that constitutes a word, and the like.

In this case, as a method for judging an unregistered word based on a number of measures, an equation for linear judgment which is previously obtained using a lot of recognition results is used. However, besides this method, it is also effective to use a so-called learning machine such as a neural network, a decision tree, a support vector machine (SVM) and the like.

It has been described above that the unregistered word candidate search unit 105 uses a method for searching for an unregistered word based on the edit distance between phoneme sequences. In this method, it is also effective not to define the edit distances of all the insertion error, omission error and substitution error as "1", but to define the edit distances as continuous values obtained based on their error occurrence probabilities.

In addition, a method can be used in which data with the same format as the data stored in the speech recognition vocabulary storage unit 102 is previously stored in the unregistered word storage unit 106, and the unregistered word candidate search unit 105 checks the input speech directly against the stored words using the parameters of the input speech, as is the case with the speech recognition unit 101, and outputs the unregistered word candidates and their unregistered word scores. With this structure, increased resources are required for the unregistered word search, but the accuracy of the unregistered word search is improved. This is an advantage of this structure. This method can also keep the effect that the recognition rate of a target word is not decreased, which is the feature of the present invention.

Above description is based on the assumption that the words stored in the unregistered word storage unit 106 and the words stored in the speech recognition vocabulary storage unit 102 do not overlap with each other. However, the words stored in the unregistered word storing storage unit 106 may be included in the words stored in the speech recognition vocabulary storage unit 102. If the unregistered word candidate search unit 105 searches and finds a word stored in the speech recognition vocabulary storage unit 102, it may output the candidates by excluding this word to the result display unit 107. By doing so, it is possible to determine the vocabulary stored in the unregistered word storage unit 106, regardless of the contents of the speech recognition vocabulary storage unit 102, thus making it easy to perform maintenance of the unregistered word storage unit 106. This is an effect of this structure.

The first embodiment has been described on the assumption that an input utterance is an utterance of a word or words, but it may be an utterance of a sentence. In this case, the unregistered word judgment unit 104 needs to perform the processing of judging whether or not an uttered sentence includes an unregistered word, and if the unregistered word is included, judging the position of the word in the sentence. However, the other operations are exactly the same.

The first embodiment has been described on the assumption that the unregistered word candidate search unit 105 outputs five unregistered word candidates. However, it is effective to change the number of candidates to be outputted depending on the accuracy of unregistered word search by the unregistered word candidate search unit 105, or the unregistered word candidate search unit 105 may change the number of candidates to be outputted depending on the similarity of each unregistered word. Therefore, in certain cases, the number of unregistered word candidates to be outputted might be one depending on the search accuracy of the unregistered word candidate search unit 105 or the unregistered word score of the retrieved unregistered word. This structure produces an effect that the user can judge whether or not his/her uttered word is included in the candidate list without being unnecessarily burdened.

Furthermore, FIG. 9 shows the example in which all the unregistered word candidates are displayed in the same manner. However, it is possible to highlight the unregistered word candidate which is most likely to be the user's utterance in the display of the result display unit 107, in such a manner as to change the font size, make it bold, or change its color according to the score of the candidate. By doing so, it is possible to produce an effect of reducing the burden on the user when he/she searches for his/her uttered word among the list.

Second Embodiment

Next, a speech recognition device according to the second embodiment of the present invention will be described.

Figure 12:
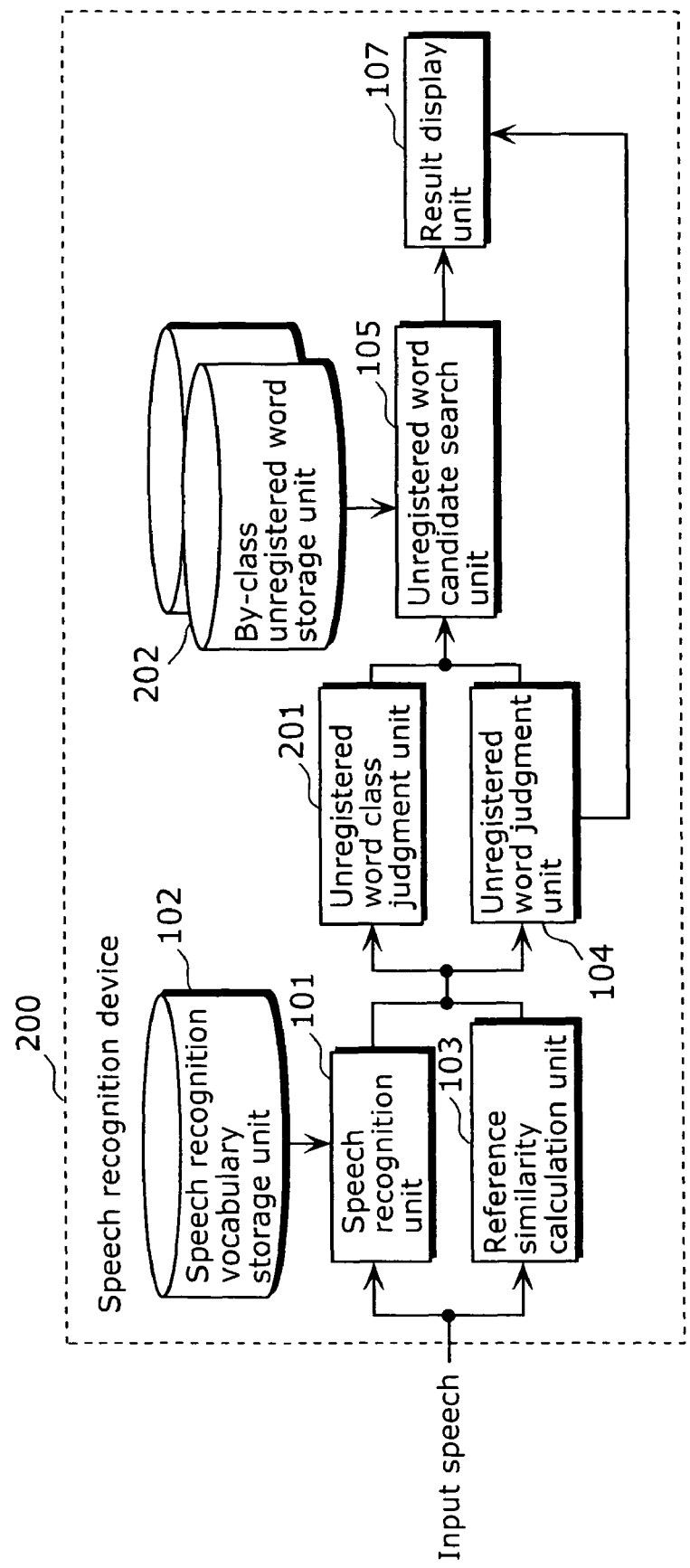
FIG. 12 is a block diagram which shows a functional structure of a speech recognition device in the second embodiment of the present invention.

FIG. 12 is a block diagram which shows a functional structure of the speech recognition device in the second embodiment of the present invention.

As shown in FIG. 12, the speech recognition device 200 is the same as the speech recognition device 100 in the first embodiment in that they both include the speech recognition unit 101, the speech recognition vocabulary storage unit 102, the reference similarity calculation unit 103, the unregistered word judgment unit 104, the unregistered word candidate search unit 105, and the result display unit 107. However, the speech recognition device 200 in the second embodiment is different from the speech recognition device 100 in the first embodiment in that the former includes an unregistered word class judgment unit 201 and a by-class unregistered word storage unit 202. A description is given below by focusing on these different points. Note that the same elements as those in the first embodiment are assigned the same reference numbers and the description thereof is not repeated here.

The unregistered word class judgment unit 201 is a processing unit which judges, based on a user's utterance of a word and how the system is used by the user, to which category the uttered word belongs, when the uttered word is an unregistered word.

The by-class unregistered word storage unit 202 is a storage device such as a hard disk or the like which stores unregistered words by category.

Next, the operations of the speech recognition device 200 according to the second embodiment will be described.

In the case where the user's utterance is a word stored in the speech recognition vocabulary storage unit 102, the operations of the speech recognition device in the second embodiment is the same as the operations as shown in the first embodiment.

When the user's utterance is an unregistered word, the unregistered word judgment unit 104 makes an unregistered word judgment based on the reference similarity obtained by the reference similarity calculation unit 103. At the same time, the unregistered word class judgment unit 201 judges to which category the unregistered word belongs. Here, the categories of unregistered words are, for example, proper personal names such as entertainer names, proper titles such as TV program titles, proper place names such as sightseeing spot names, as shown in FIG. 13. Note that how the unregistered word class judgment unit 201 judges the unregistered word category will be described later.

When the user's utterance is an unregistered word and the category of the word is estimated, the unregistered word candidate search unit 105 carries out a search for the unregistered word. The unregistered word candidate search unit 105 narrows down the search range of the words stored in the by-class unregistered word storage unit 202 based on the class judgment result by the unregistered word class judgment unit 201 so as to search for the unregistered word. When obtaining the unregistered word candidates as such, the speech recognition device 200 presents the unregistered word candidates to the user via the result display unit 107, as is the case with the first embodiment.

A detailed description about the operations of the unregistered word class judgment unit 201 is given below.

Figure 14:
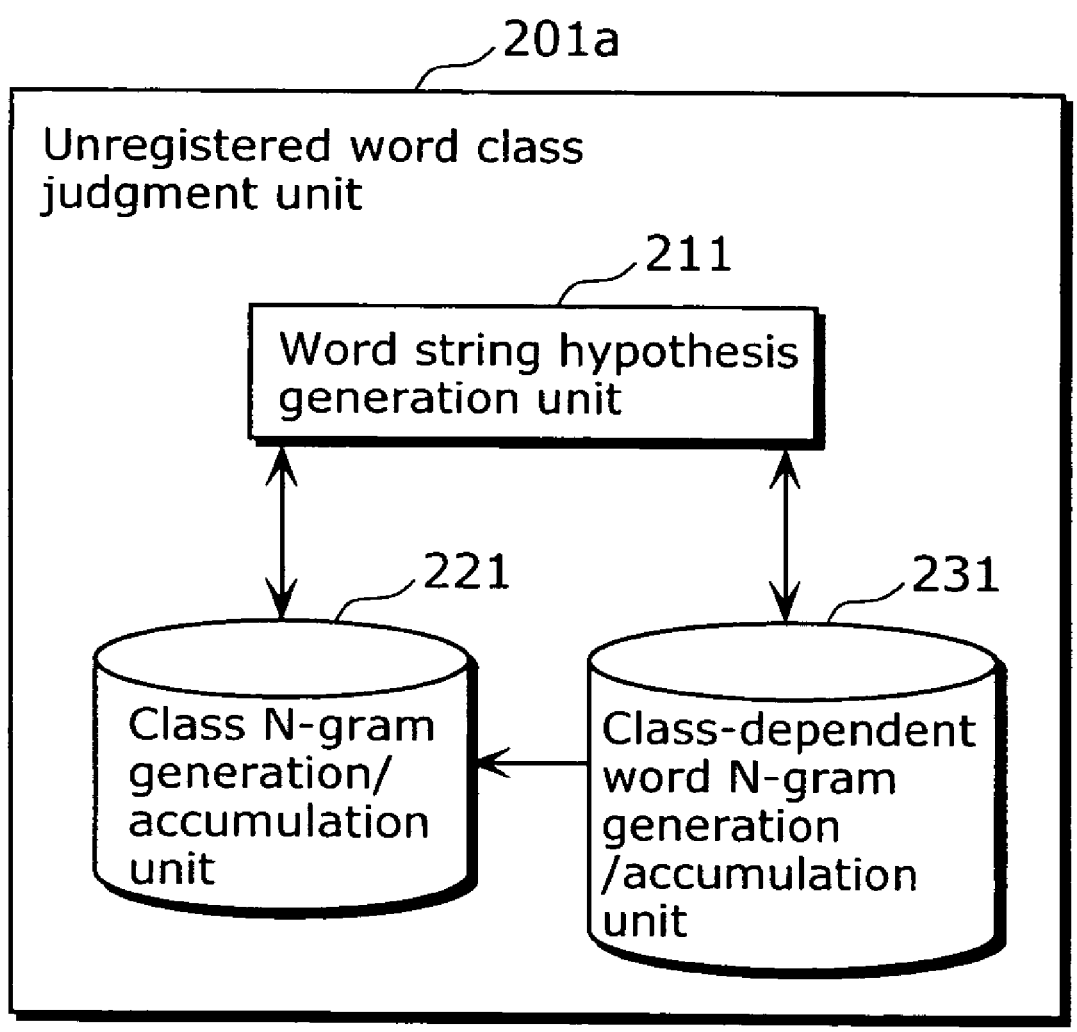
FIG. 14 is a block diagram which shows a functional structure of an unregistered word class judgment unit that uses a class N-gram language model.

In the case where the user utters a sentence, the unregistered word category can be judged based on the information regarding the context of the unregistered word in the recognized sentence. For example, the user utters "XXX no shutsuen shiteiru bangumi ga mitai (I want to see the TV program in which XXX appears)", "XXX" is regarded as an unregistered word in the class of proper celebrity names, while if the user utters "Asu no YYY wo rokuga shite (Record YYY tomorrow)", "YYY" is regarded as an unregistered word in the class of TV program titles. As a model for estimating the class of a target word based on the context of the sentence, a class N-gram language model including the class of an unregistered word can be used. FIG. 14 shows a functional structure of the unregistered word class judgment unit that uses the class N-gram language model including the class of unregistered words.

As shown in FIG. 14, the unregistered word class judgment unit 201a, which uses the class N-gram language model, includes a word string hypothesis generation unit 211, a class N-gram generation/accumulation unit 221, and a class-dependent word N-gram generation/accumulation unit 231.

The word string hypothesis generation unit 211 generates a word string hypothesis from a result of word comparison by referring to the class N-grams for evaluating a sequence of words and unregistered word classes, as well as a class-dependent word N-grams for evaluating a word string that constitutes an unregistered word class, and obtains the recognition result.

The class N-gram generation/accumulation unit 221 generates class N-grams for assigning the language likelihood which is a logarithm value of a linguistic probability to a context including an unregistered word class, and accumulates the generated class N-grams.

The class-dependent word N-gram generation/accumulation unit 231 generates a class-dependent word N-grams for assigning the language likelihood which is a logarithm value of a linguistic probability to a word string in the unregistered word class, and accumulates the generated class-dependent word N-grams.

Figure 15:
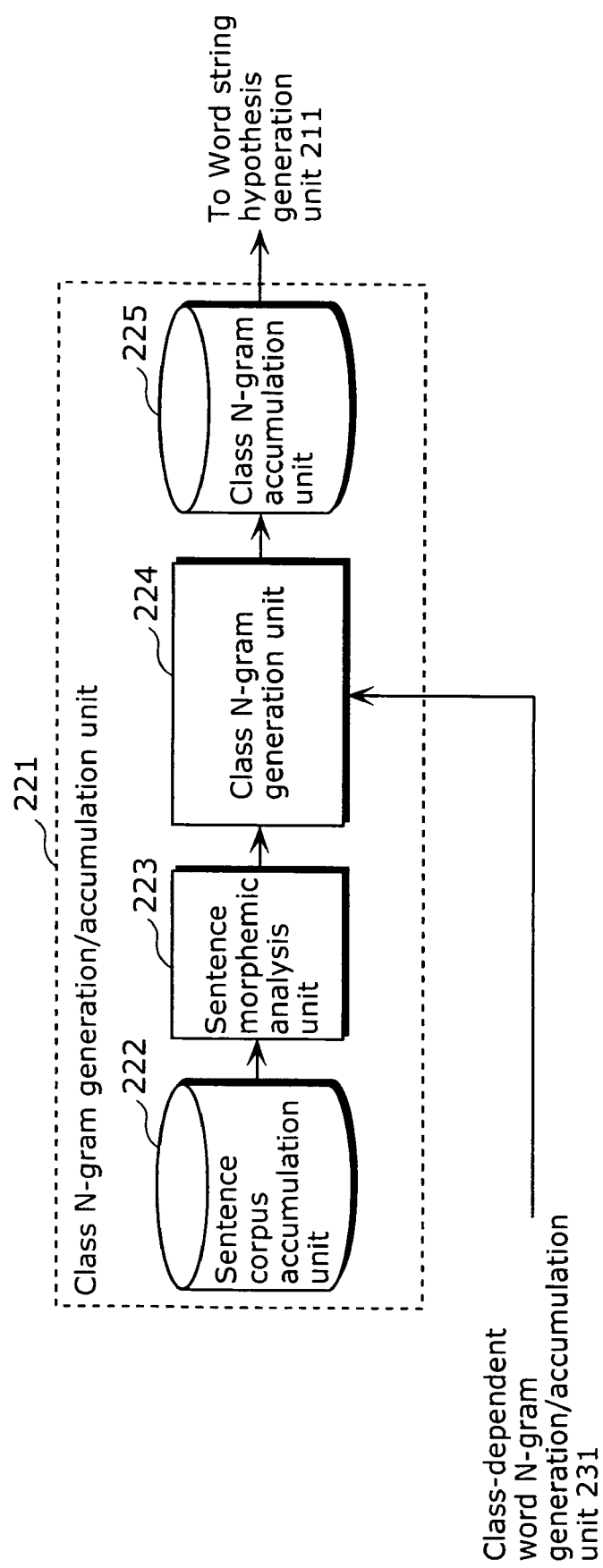
FIG. 15 is a block diagram which shows a functional structure of a class N-gram generation/accumulation unit.

FIG. 15 shows a functional structure of the class N-gram generation/accumulation unit 221.

As shown in FIG. 15, the class N-gram generation/accumulation unit 221 is comprised of: a sentence corpus accumulation unit 222 in which a lot of sentences to be recognized are previously accumulated as texts; a sentence morphemic analysis unit 223 which performs morphemic analysis of sentences; a class N-gram generation unit which determines the statistics of each chain of words and word classes from the result of morphemes by reference to the definitions of word string classes so as to generate class N-grams; and a class N-gram accumulation unit 225 which accumulates class N-grams and outputs them to the word string hypothesis generation unit 211.

The sentence corpus accumulation unit 222 previously accumulates a lot of data libraries of sentences to be recognized.

The sentence morphemic analysis unit 223 analyzes each morpheme which is the smallest meaningful unit in a given language in the text of a relatively long sentence accumulated in the sentence corpus accumulation unit 222, such as "Ashita no tenki yoho wo rokuga shite (Record weather forecast for tomorrow)" and the like.

The class N-gram generation unit 224 extracts word strings included in the morphemic-analyzed text. Then, referring to the unregistered word classes inputted from the class-dependent word N-gram generation/accumulation unit 231 to be described later, if a matching unregistered word class is present, the class N-gram generation unit 224 generates class N-grams for which a chain of words or unregistered word classes and their probabilities are associated with each other, by substituting the unregistered word class included in the text into a virtual word and determining the statistics of the chain of words or unregistered word classes. The class N-grams generated by the class N-gram generation unit 224 are accumulated in the class N-gram accumulation unit 225.

By measuring the frequency of each chain of words, a conditional probability can be calculated and an unregistered word class is virtually handled as a single word, thus a language model with a conditional probability is generated for each word.

Figure 16:
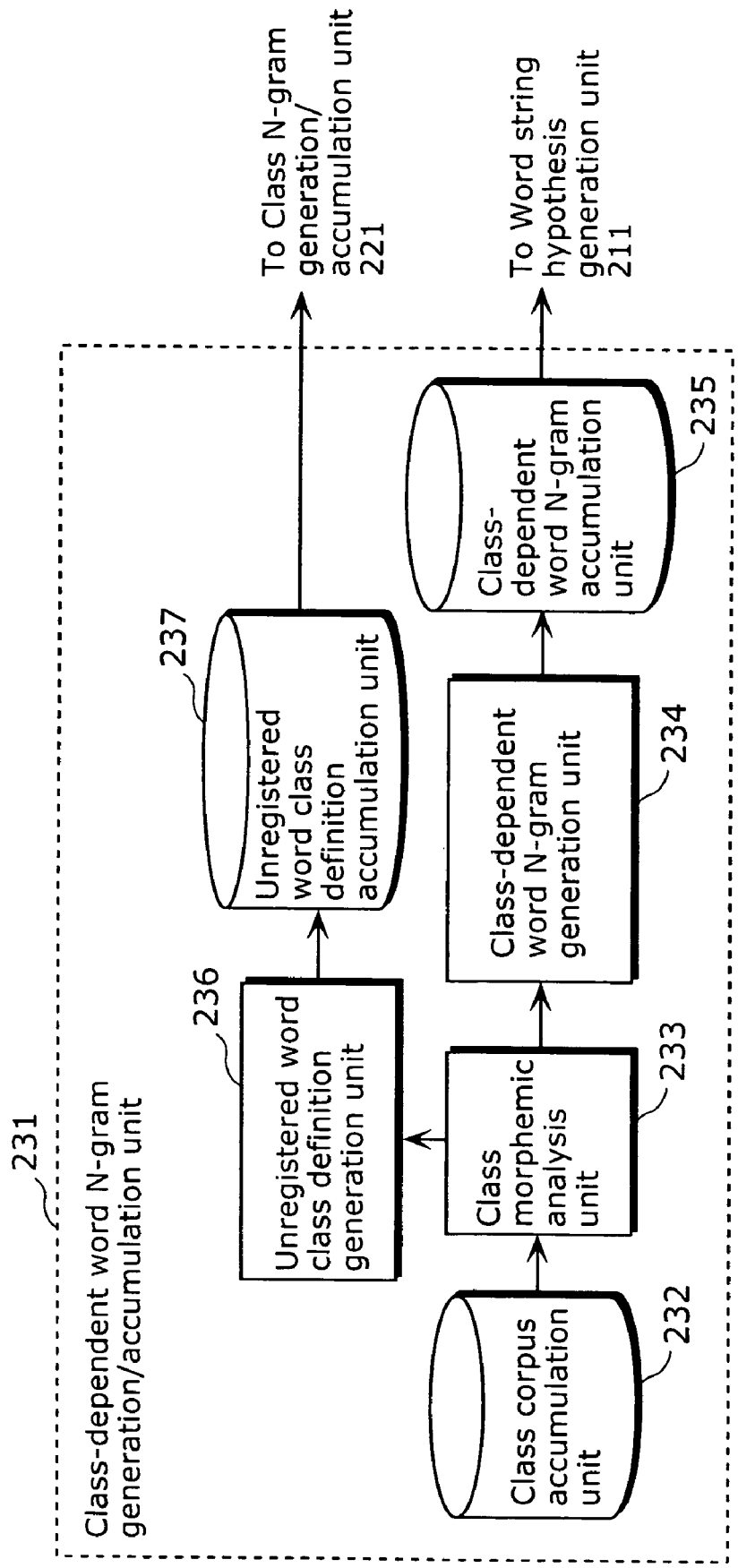
FIG. 16 is a block diagram which shows a functional structure of a class-dependent word N-gram generation/accumulation unit.

Next, a functional structure of the class-dependent word N-gram generation/accumulation unit 231 is shown in FIG. 16.

As shown in FIG. 16, the class-dependent word N-gram generation/accumulation unit 231 is comprised of a class corpus accumulation unit 232, a class morphemic analysis unit 233, a class-dependent word N-gram generation unit 234, a class-dependent word N-gram accumulation unit 235, an unregistered word class definition generation unit 236, and an unregistered word class definition accumulation unit 237.

The class corpus accumulation unit 232 previously accumulates data libraries of unregistered words having the same semantic and syntactic properties (for example, a TV program title, a personal name, and the like).

The class morphemic analysis unit 233 performs morphemic analysis of a class corpus. More specifically, the class morphemic analysis unit 122 analyzes, on a morpheme basis, unregistered words which are relatively short and have common properties and which are accumulated in the class corpus accumulation unit 121, such as a television program title like "MMM-Tenki-yoho".

The class-dependent word N-gram generation unit 234 performs processing on the results of morphemic analyses, determines the statistics of each chain of words, and generates class-dependent word N-grams being information in which word strings and their probabilities are associated with each other.

The class-dependent word N-gram accumulation unit 235 accumulates the class-dependent word N-grams generated by the class-dependent word N-gram generation unit 234. This class-dependent word N-grams accumulated in the class-dependent word N-gram accumulation unit 235 are referred to by the word string hypothesis generation unit 211 at the time of speech recognition.

The unregistered word class definition generation unit 236 generates the definitions of respective unregistered word classes in which unregistered words with common properties are defined as classes on the basis of the results of morphemic analyses of the class corpus. More specifically, the unregistered word class definition generation unit 236 generates the definitions of the respective word classes in which words with common properties are defined as classes based on the words that are analyzed on a morpheme-by-morpheme basis.

The unregistered word class definition accumulation unit 237 accumulates the definitions of unregistered word classes generated by the unregistered word class definition generation unit 236. Such definitions of unregistered word classes are referred to by the class N-gram generation unit 224 of the class N-gram generation/accumulation unit 221 when generating the above-mentioned class-N grams.

In a class N-gram language model used in the unregistered word class judgment unit 201a having the above structure, the probability that a sequence of words $W_1 \ldots W_1$ consisting of I words will appear is formulated using the probability of a chain of n words, as the following equation:

$$P(W_1, W_2, \ldots, W_I) = \prod_{j=1}^{I} \{P(C_j \mid C_{j-n+1}, \ldots, C_{j-1}) \cdot P(W_j \mid C_j)\}$$ [Equation 1]

where $W_1, W_2 \ldots W_1$ are respective words, and $C_1, C_2 \ldots C_I$ are classes to which the respective corresponding words belong.

Therefore, $P(C_j|C_{j-n+1}, \ldots, C_{j-1})$ indicates the probability that a chain of n word classes will appear, and $P(W_j|C_j)$ indicates the probability that a specific word $W_j$ will appear in this class $C_j$. Here, a class is a unit of speech fragments, such as a word class (part of speech), a smaller unit, and the like, obtained in consideration of continuity of words.

When this type of a common class N-gram language model is used, since $W_j$ is an unregistered word, $P(W_j|C_j)$ cannot be previously obtained for the unregistered word class. One of the models having $P(W_j|C_j)$ for unregistered words is a method for modeling an unregistered word $W_j$ as a chain of smaller basic words in the functional structure as shown in above FIGS. 14 to 16 (see Japanese Patent Application No. 2003-276844 "Continuous Speech Recognition Device and Continuous Speech Recognition Method").

When this model is used as a model for judging the categories of unregistered words, a class is defined for each category of unregistered words to be judged, such as a "class of unregistered proper celebrity names" and a "class of unregistered proper TV programs", for training of the language model.

FIG. 17 shows an example of a language model obtained by such training when n=3. Using the language model shown in this example, when "XX" is considered to be included in the class of proper TV program titles, the probability of occurrence of "XX wo rokuga (record XX)" is represented as $P(\text{<action "rokuga">}|\text{<unregistered proper TV program title>,<case particle>})\cdot P(\text{rokuga}|\text{<action "rokuga">})=0.8\times0.35=0.28$ [Equation 2]

On the other hand, when "XX" is considered to be included in the class of proper celebrity names, the probability is represented as $P(\text{<action "rokuga">}|\text{<unregistered proper celebrity name>,<case particle>})\cdot P(\text{rokuga}|\text{<action "rokuga">})=0.2\times0.35=0.07$ [Equation 3]

More specifically, since the higher probability is obtained when "XX" is considered to be included in the class of proper TV program titles, it can be judged that "XX" is included in the class of proper TV program titles.

In the exactly same manner, when "YY" is considered to be included in the class of proper TV program titles, the probability of occurrence of "YY no shutsuen (YY appears)" is represented as $P(\text{<action "shutsuen">}|\text{<unregistered proper TV program title>,<case particle>})\cdot P(\text{shutsuen}|\text{<action "shutsuen">})=0.1\times0.35=0.035$ [Equation 4]

On the other hand, when "YY" is considered to be included in the class of proper celebrity names, the probability is represented as $P(\text{<action "shutsuen">}|\text{<unregistered proper celebrity name>,<case particle>})\cdot P(\text{shutsuen}|\text{<action "shutsuen">})=0.7\times0.35=0.245$ [Equation 5]

In other words, since the higher probability is obtained when "YY" is considered to be included in the class of proper celebrity names, it can be judged that "YY" is included in the class of proper celebrity names.

As described above, according to the speech recognition device 200 in the second embodiment, for example, when the user's utterance is "Kyou no 'Matushita-Taro' no deteiru bangumi (Today's program in which Matsushita Taro appears)" and "Matsushita-Taro" is an unregistered word, "Matsushita-Taro" is estimated as an unregistered word belonging to the class of proper celebrity names, and the unregistered word candidates are searched within the unregistered word storage unit for the class of proper celebrity names in the by-class unregistered word storage unit 202. As a result of the search, a number of unregistered word candidates are retrieved and presented to the user via the result display unit 107, and then a response as shown above in FIG. 9 is returned.

Figures 18, 19:
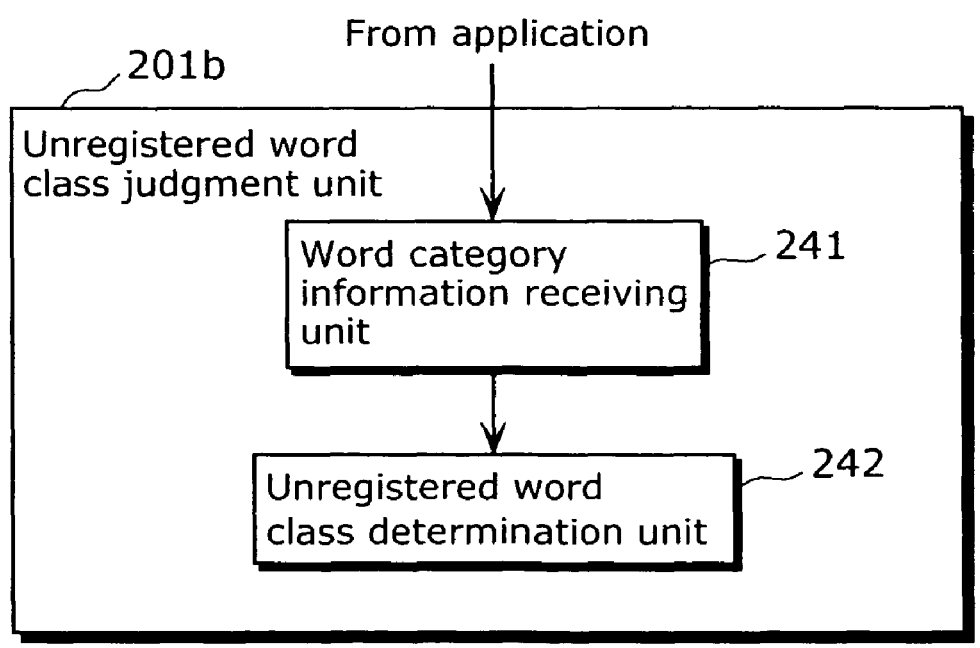
FIG. 18 is a diagram which shows an example of a recognition result displayed in the second embodiment when an unregistered word of a different class is uttered.
FIG. 19 is a diagram which shows a structure of an unregistered word class judgment unit in the second embodiment that acquires information for judging the class of an unregistered word from an external application.

On the other hand, when the user's utterance is "Asu no 'Taiyo-wo-Ute' wo rokuga shite (Record tomorrow's 'Taiyo-wo-Ute')" and "Taiyo-wo-Ute" is an unregistered word, "Taiyo-wo-Ute" is estimated as an unregistered word belonging to the class of proper TV program titles, and the unregistered word candidates are searched within the unregistered word storage unit for the class of proper TV program titles in the by-class unregistered word storage unit 202. Then, as a result of the search, a number of unregistered word candidates, for example, the word candidates included in the class of unregistered proper TV programs as shown in FIG. 18, are retrieved and presented to the user via the result display unit 107.

As described above, it can be said the effects of narrowing down the search range for an unregistered word according to the category of the word are that: it is possible to prevent a presentation of unregistered word candidates in the unintended category, such as a presentation of TV program titles for the search of personal names, thus preventing a user from being confused; and it is possible to improve the search accuracy of unregistered words by narrowing down the search range.

Note that in the second embodiment, an example of a judgment method employing a class N-gram language model is shown as a method for judging an unregistered word category in the unregistered word class judgment unit. Other than the above-mentioned judgment method, it is possible to use a method employing dialog context information in the case where a speech recognition system including this unregistered word presentation unit is used as an input interface of an interactive voice system. In this method, the dialog management unit in the interactive voice system generates estimation information regarding a category of words that are likely to be uttered by a user based on dialog history information, and transmits the category to the unregistered word class judgment unit. The unregistered word class judgment unit judges the category of the unregistered word based on the transmitted estimation information regarding the word category. FIG. 19 shows a block diagram of an unregistered word class judgment unit having the above structure.

In this case, the unregistered word class judgment unit 201b includes: a word category information receiving unit 241 which obtains a category of an uttered word from an external application; and an unregistered word class determination unit 242 which determines the category of a word judged to be an unregistered one, based on the category obtained by the word category information receiving unit 241. It can be said that one of the effects of adopting this structure is that it is possible to determine the category using the estimation result in the application such as the dialog management unit even if an input speech is a word or words, whereas an input speech is expected to be an utterance of a sentence when the unregistered word category is judged using a class N-gram language model.

Third Embodiment

Next, a speech recognition device according to the third embodiment of the present invention will be described.

Figure 20:
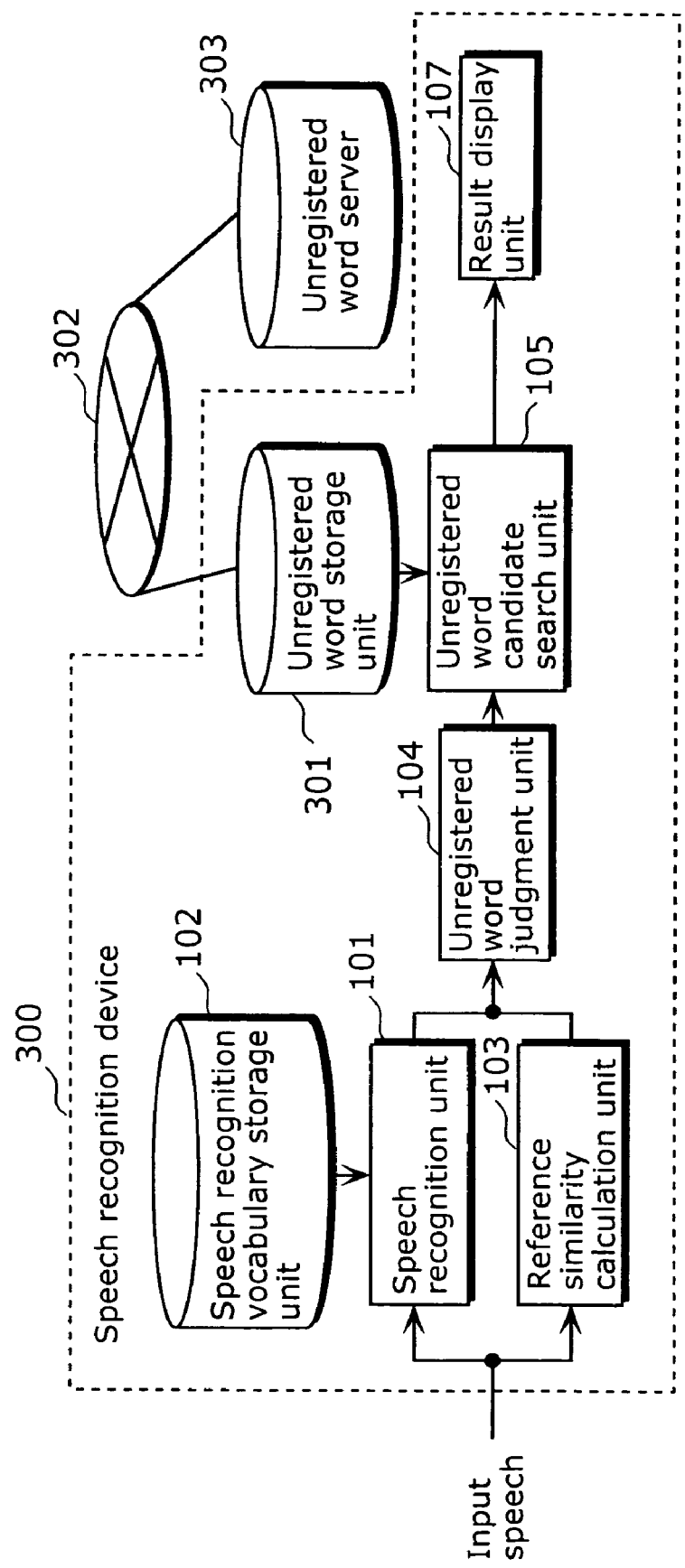
FIG. 20 is a block diagram which shows a functional structure of a speech recognition device in the third embodiment of the present invention.

FIG. 20 is a block diagram which shows a functional structure of the speech recognition device in the third embodiment of the present invention.

As shown in FIG. 20, the speech recognition device 300 is the same as the speech recognition device 100 and the like in the first embodiment and the like in that they all include the speech recognition unit 101, the speech recognition vocabulary storage unit 102, the reference similarity calculation unit 103, the unregistered word judgment unit 104, the unregistered word candidate search unit 105, and the result display unit 107. However, the speech recognition device 300 in the third embodiment is different from the speech recognition device 100 and the like in the first embodiment and the like in that the former includes an unregistered word storage unit 301 connected to an unregistered word server 303 via a network 302. A description is given below by focusing on this different point. Note that the same reference numbers are used for the same elements as those in the above first embodiment and the like, and the description thereof is not repeated here.

The unregistered word storage unit 301 has functions not only for storing a lot of unregistered words to be searched by the unregistered word candidate search unit 105 but also for updating the stored information by a communication means.

The network 302 is a communication network such as the Internet, telephone lines, and the like.

The unregistered word server 303 is a server device which stores necessary up-to-date unregistered words, and provides the information regarding these words in response to the request from a client (here, the speech recognition device).

Next, a description is given as to the operations of the speech recognition device 300 structured as mentioned above.

The flow of outputs from the speech recognition device in response to the user's utterance is the same as that shown in the first embodiment. The third embodiment is different from the first embodiment in how to maintain the unregistered word storage unit 301 referred to by the unregistered word candidate search unit 105.

In the third embodiment, the unregistered word storage unit 301 can be updated arbitrarily. More specifically, fixed storage of words, such as proper personal names and proper program titles which change and increase on a daily basis, could cause a situation in which the user's utterance cannot be found when unregistered word candidates are searched. For example, at the time of program rescheduling in TV broadcasts, start of a new season of professional sports, and the like, new program titles to be broadcasted appear, and new entertainers and athletes appear. They are all unregistered words.

Therefore, by making the words stored in the unregistered word storage unit 301 updatable so as to store these new unregistered words into the unregistered word storage unit 301, it is possible to avoid the situation in which the user's utterance cannot be found at the time of the search for unregistered word candidates.

Specifically, the words stored in the unregistered word storage unit 301 are updated in the following manner.

It is previously determined a date on which words which have not yet been registered in the unregistered word storage unit 301 are likely to increase rapidly. When that day comes, a request for updating unregistered words is automatically transmitted to the unregistered word server 303 via the network 302 such as telephone lines and the Internet. Or, not only the unregistered word storage unit 301 updates the words according to the predetermined schedule, but also in response to the update request from the user who feels an insufficient number of registered words, the unregistered word storage unit 301 transmits the update request to the unregistered word server 303. Or, not only the unregistered word storage unit 301 always transmits the update request to the unregistered word server 303 in an active manner, but also when detecting an addition of a predetermined number of unregistered words, the unregistered word server 303 may transmit the update information to the unregistered word storage unit 301 of each client. When receiving the update request or judging that the update is needed because the number of new unregistered words reaches a predetermined number, the unregistered word server 303 returns the information regarding the added words to the unregistered word storage unit 301 of the client.

By doing so, unregistered words need to be properly maintained only on the unregistered word server 303. Therefore, each client can maintain the unregistered word storage unit 301 in the best condition if only he/she has a communication means for accessing the unregistered word server 303.

In addition, by providing new unregistered words from an external server as mentioned above, it is possible to obtain the effect that the unregistered words storage unit 301 can be maintained in the best condition without bothering the user to register these new words into the unregistered word storage unit 301.

In the third embodiment, the words stored in the unregistered word storage unit 301 are updated under the control of the unregistered word server 303 which is dedicated to updating words and maintained in the best condition. It should be noted, however, that the words can be updated using the information held by another server which does not specialize in updating.

For example, in TV broadcasting, an electronic program guide (EPG) is transmitted for each broadcast wave. It is possible to automatically extract program titles and cast names recorded in the EPG and store them into the unregistered word storage unit 301. Similarly, as Web services on the Internet, there are a lot of websites describing information regarding entertainers, websites describing information regarding TV programs, and the like. It is also possible to collect necessary information by cyclically visiting these websites and store the information into the unregistered word storage unit 301. Furthermore, it is also possible to extract in advance information regarding the categories that are unlikely to be uttered by the user, for example, professional baseball player names, foreign movie actor names, Japanese movie titles, and the like, from the unregistered word reference history records of the user, so as to avoid the unregistered words in these extracted categories from being obtained from the unregistered word server 303. Accordingly, it is also possible to have an effect that unnecessary enlargement of the volume of the unregistered word storage unit 301 is prevented.

A modification can also be conceived in which the words stored in the speech recognition vocabulary storage unit 102 are updated. As a specific example of this modification, it is possible that a server provided outside the diagram selects a word that is likely to be uttered by the user in the near future and updates the contents of the speech recognition vocabulary storage unit 102 based on the selected word. For example, in the case where this speech recognition device 300 is applied to the programmed recording system, it is possible to preferably use, as such a word, a word related to a TV program to be broadcasted within a week from among the names of the cast and program titles recorded in the above-mentioned EPG. The server for that system generates the information to be used by the speech recognition unit 101 for recognition of the extracted word, and updates the contents of the speech recognition vocabulary storage unit 102 according to the generated information.

This update operation can be performed in exactly the same manner as the operation for updating the contents of the unregistered word storage unit 301 from the unregistered word server 303 via the network 302. It is more preferable to delete the information for recognizing words related to a program which was to be broadcasted in the past and instead add the information for recognizing words related to a program to be broadcasted a week later, on a daily basis.

With this structure, in the case where the frequency in use of a registered word changes in time as predetermined, only a relatively small number of recognition information that are likely to be used frequently can be stored in the speech recognition vocabulary storage unit 102 using the recognition information (speech recognition vocabulary) given from outside in accordance with the change. Therefore, it is possible to easily reduce the recognition time and improve the recognition rate.

Fourth Embodiment

Next, a speech recognition device according to the fourth embodiment of the present invention will be described.

Figure 21:
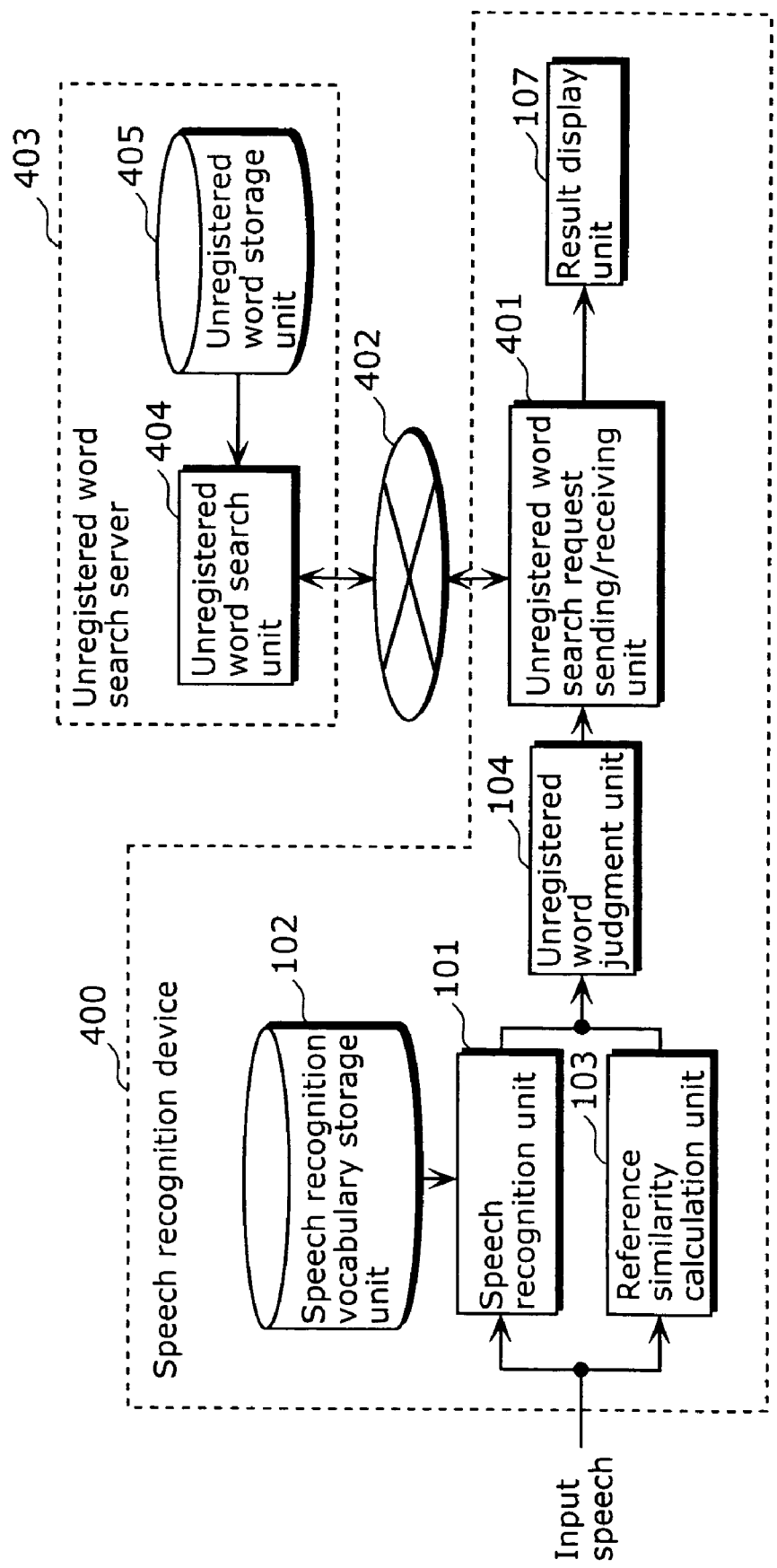
FIG. 21 is a block diagram which shows a functional structure of a speech recognition device in the fourth embodiment of the present invention.

FIG. 21 is a block diagram which shows the functional structure of the speech recognition device in the fourth embodiment of the present invention.

As shown in FIG. 21, the speech recognition device 400 is the same as the speech recognition device 100 and the like in the first embodiment through third embodiment in that they all include the speech recognition unit 101, the speech recognition vocabulary storage unit 102, the reference similarity calculation unit 103, the unregistered word judgment unit 104 and the result display unit 107. However, the speech recognition device 400 in the fourth embodiment is different from the speech recognition device 100 and the like in the first through third embodiments in that the former includes an unregistered word search request sending/receiving unit 401 connected to an unregistered word search server 403 via a network 402. A description is given below by focusing on this different point. Note that the same reference numbers are used for the same elements as those in the above first embodiment and the like, and the description thereof is not repeated here.

The unregistered word search request sending/receiving unit 401 is a processing unit which sends a request for searching for an unregistered word to the unregistered word search server 403 via the network 402 and receives the search result of the unregistered word from the unregistered word search server 403, and is embodied as a communication interface or the like. When the search of an unregistered word is needed, this unregistered word search request sending/receiving unit 401 sends, to the unregistered word search server 403 via the network 402, the information which indicates the details of an unregistered word part of an utterance, such as a subword sequence obtained by the reference similarity calculation unit 103 in the first embodiment, parameters of the unregistered word part in the input speech, and the like, and outputs, to the result display unit 107, the reply from the unregistered word search server, as a result of the unregistered word search.

The network 402 is a communication network such as the Internet, telephone lines, and the like.

The unregistered word search server 403 is a server device which searches for an unregistered word in response to a request from a client (i.e., the speech recognition device 400), and includes an unregistered word search unit 404 and an unregistered word storage unit 405.

The unregistered word search unit 404 not only is a processing unit which searches for an unregistered word, but also has a communication function of receiving information regarding the unregistered word from a client via the network 402 and returning the search result via the network 402.

The unregistered word storage unit 405 is a storage device such as a hard disk or the like which stores information regarding unregistered words.

Next, a description is given as to the operations of the speech recognition device 400 structured as mentioned above.

The flow of outputs from the speech recognition device in response to the user's utterance in the fourth embodiment is the same as that shown in the first embodiment. The fourth embodiment is different from the first embodiment in that the former does not include the unregistered word candidate search unit 105, but delegates a task of searching for unregistered word candidates to an external server.

More specifically, when it is judged that a user's utterance includes an unregistered word, the unregistered word search request sending/receiving unit 401 sends a subword sequence of an unregistered word part obtained by the reference similarity calculation unit 103 to the unregistered word search server 403. When receiving the subword sequence of the unregistered word part from the client, the unregistered word search unit 404 searches for the unregistered word uttered by the user among the words stored in the unregistered word storage unit 405. Here, as a method for searching for an unregistered word using a subword sequence, the method as described using FIG. 10 in the first embodiment and the like are effective. The search result obtained as described above is, as unregistered word candidates, returned to the unregistered word search request sending/receiving unit 401 via the network 402. The unregistered word search request sending/receiving unit 401 passes the returned unregistered word search result to the result display unit 107, and presents to the user via the result display unit 107 that the user's uttered word is an unregistered one.

As described above, by delegating the process to search for an unregistered word to an external server and placing the server remotely, it is possible to produce an effect that the maintenance of the unregistered word storage unit, which changes in content and increases in volume, can be centralized so as to hold down the maintenance cost.

Large calculation resources are required to search for a target word in a list of a large amount of vocabulary. However, by delegating such a task to an external device, it is possible to produce an effect that the hardware structure of the speech recognition device itself can be made compact.

In contrast, the server side can generally have a relatively large hardware structure. Therefore, it is possible to implement, on the server, an unregistered word search algorithm which is difficult to be implemented in the client side such as a mobile terminal, judging from its hardware structure, and therefore to enhance the search accuracy of unregistered words.

The fourth embodiment shows an example where a subword sequence is used as search data for searching for an unregistered word. It should be noted however, that as described in the first embodiment, it is also possible to implement the unregistered word search server so that it performs the search of an unregistered word using the user's uttered speech itself or the acoustic parameters extracted therefrom.

INDUSTRIAL APPLICABILITY

The present invention is capable of being used in a various types of electronic equipment utilizing a speech recognition technique, as an input means for a device, including AV equipment such as a television and a video recorder, car-mounted equipment such as a car navigation system, and a mobile terminal device such as a PDA and a cellular telephone. Therefore, the present invention provides a significantly high and wide industrial applicability.

The invention claimed is:

1. A speech recognition device that recognizes uttered speech and presents a result of the recognition of the uttered speech, the speech recognition device comprising:
a speech recognition word storage unit operable to define a vocabulary for speech recognition and operable to store the vocabulary for speech recognition as a plurality of registered words;
a speech recognition unit operable to check the uttered speech against the plurality of registered words stored in said speech recognition word storage unit;
a reference similarity calculation unit operable to search for a sequence having a highest similarity to the uttered speech, and operable to calculate a reference similarity regarding the sequence, the sequence being a combination of acoustic units, which are subwords;
an unregistered word judgment unit operable to judge whether the uttered speech is one of (i) a registered word of the plurality of registered words stored in said speech recognition word storage unit, and (ii) an unregistered word, which is not stored in said speech recognition word storage unit, said unregistered word judgment unit performing the judgment by comparing a similarity between the plurality of registered words checked against the uttered speech by said speech recognition unit and the uttered speech with the reference similarity calculated by said reference similarity calculation unit;
an unregistered word storage unit operable to store a plurality of unregistered words;
an unregistered word candidate search unit operable to search, from among the plurality unregistered words stored in said unregistered word storage unit, for an unregistered word candidate likely to correspond to the uttered speech, based on the uttered speech, said unregistered word candidate search unit performing the search when said unregistered word judgment unit judges that the uttered speech an unregistered word; and
a result display unit operable to display a result of the search performed by said unregistered word candidate search unit together with an indication that the uttered speech is an unregistered word.

2. The speech recognition device according to claim 1, wherein said unregistered word candidate search unit is operable to search for a plurality of unregistered word candidates from among the plurality of unregistered words stored in said unregistered word storage unit.

3. The speech recognition device according to claim 2, wherein said unregistered word storage unit is operable to store the plurality of unregistered words according to categories into which the plurality of unregistered words are classified.

4. The speech recognition device according to claim 1, wherein said unregistered word storage unit is operable to store the plurality of unregistered words according to categories into which the plurality of unregistered words are classified.

5. The speech recognition device according to claim 4, further comprising an unregistered word class judgment unit operable to judge a category of the unregistered word candidate based on the uttered speech.

6. The speech recognition device according to claim 5, wherein said unregistered word candidate search unit is operable to search for a plurality of unregistered word candidates from among the categories into which the plurality of unregistered words are classified in said unregistered word storage unit, said unregistered word candidate search unit performing the search for the plurality of unregistered word candidates based on a result of the judgment performed by said unregistered word class judgment unit.

7. The speech recognition device according to claim 4, further comprising an information acquisition unit operable to acquire information regarding the categories,
wherein said unregistered word candidate search unit is operable to search for a plurality of unregistered word candidates from among the categories into which the plurality of unregistered words are classified in said unregistered word storage unit, said unregistered word candidate search unit performing the search for the plurality of unregistered word candidates based on the information acquired by said information acquisition unit.

8. The speech recognition device according to claim 1, wherein said result display unit is operable to display the result of the search performed by said unregistered word candidate search unit, by excluding the plurality of registered words stored in said speech recognition word storage unit from the result of the search performed by said unregistered word candidate search unit.

9. The speech recognition device according to claim 1, wherein said unregistered word candidate search unit is operable to search for the unregistered word candidate by calculating an unregistered word score indicating a degree of similarity to the uttered speech.

10. The speech recognition device according to claim 9, wherein said result display unit is operable to display the unregistered word candidate and the calculated unregistered word score, as the result of the search performed by said unregistered word candidate search unit.

11. The speech recognition device according to claim 10, wherein said result display unit is operable to change the display of the unregistered word candidate according to the calculated unregistered word score.

12. The speech recognition device according to claim 1, wherein the plurality of unregistered words stored in said unregistered word storage unit are updated according to a predetermined condition.

13. The speech recognition device according to claim 12, further comprising a communication unit operable to communicate with an unregistered word server that stores unregistered words that are not stored in said unregistered word storage unit,
wherein the plurality of unregistered words stored in said unregistered word storage unit are updated when said communication unit receives the unregistered words stored by the unregistered word server.

14. The speech recognition device according to claim 1, wherein the plurality of registered words stored in said speech recognition word storage unit are updated according to a predetermined condition.

15. A speech recognition system for recognizing uttered speech and presenting a result of the recognition of the uttered speech, the speech recognition system comprising:
a speech recognition device that recognizes the uttered speech; and
an unregistered word search server that searches for an unregistered word not stored in said speech recognition device,
wherein said speech recognition device includes:
a speech recognition word storage unit operable to define a vocabulary for speech recognition and operable to store the vocabulary for speech recognition as a plurality of registered words;
a speech recognition unit operable to check the uttered speech against the plurality of registered words stored in said speech recognition word storage unit;
a reference similarity calculation unit operable to search for a sequence having a highest similarity to the uttered speech, and operable to calculate a reference similarity regarding the sequence, the sequence being a combination of acoustic units, which are subwords;
an unregistered word judgment unit operable to judge whether the uttered speech is one of (i) a registered word of the plurality of registered words stored in said speech recognition word storage unit, and (ii) an unregistered word not stored in said speech recognition word storage unit, said unregistered word judgment unit performing the judgment by comparing a similarity between the plurality of resisted words checked against the uttered speech by said speech recognition unit and the uttered speech with the reference similarity calculated by said reference similarity calculation unit;
a search request sending unit operable to send, to said unregistered word search server, a search request to search for an unregistered word candidate likely to correspond to the uttered speech, said search request sending unit sending the search request when said unregistered word judgment unit judges that the uttered speech is an unregistered word;
a search result receiving unit operable to acquire a result of the search for the unregistered word candidate from said unregistered word search server; and
a result display unit operable to display a result of the search for the unregistered word candidate together with an indication that the uttered speech is an unregistered word, and wherein said unregistered word search server includes:
an unregistered word storage unit operable to store a plurality of unregistered words;
a search request receiving unit operable to receive the search request from said search request sending unit;
an unregistered word candidate search unit operable to search, from among the plurality of unregistered words stored in said unregistered word storage unit, for the unregistered word candidate likely to correspond to the uttered speech, based on the uttered speech, said unregistered word candidate search unit performing the search when said search request receiving unit receives the search request; and
a search result sending unit operable to send the result of the search performed by said unregistered word candidate search unit to said speech recognition device.

16. A speech recognition device that recognizes uttered speech and presents a result of the recognition of the uttered speech, in a speech recognition system including said speech recognition device and an unregistered word search server that searches for an unregistered word not stored in said speech recognition device, said speech recognition device comprising:
a speech recognition word storage unit operable to define a vocabulary for speech recognition and operable to store the vocabulary for speech recognition as a plurality of registered words;
a speech recognition unit operable to check the uttered speech against the plurality of registered words stored in said speech recognition word storage unit;
a reference similarity calculation unit operable to search for a sequence having a highest similarity to the uttered speech, and operable to calculate a reference similarity regarding the sequence, the sequence being a combination of acoustic units, which are subwords;
an unregistered word judgment unit operable to judge whether the uttered speech is one of (i) a registered word of the plurality of registered words stored in said speech recognition word storage unit, and (ii) an unregistered word not stored in said speech recognition word storage unit, said unregistered word judgment unit performing the judgment by comparing a similarity between the plurality of registered words checked against the uttered speech by said speech recognition unit and the uttered speech with the reference similarity calculated by said reference similarity calculation unit;
a search request sending unit operable to send, to the unregistered word search server, a search request to search for an unregistered word candidate likely to correspond to the uttered speech, said search request sending unit sending the search request when said unregistered word judgment unit judges that the uttered speech is an unregistered word;
a search result receiving unit operable to acquire a result of the search for the unregistered word candidate from the unregistered word search server; and
a result display unit operable to display the result of the search for the unregistered word candidate together with an indication that the uttered speech is an unregistered word.

17. A non-transitory computer-readable recording medium having a program recorded thereon, the program being executed by a speech recognition device that recognizes uttered speech and presents a result of the recognition of the uttered speech, the program causing a computer to execute a method comprising:

a speech recognition step of checking the uttered speech against a plurality of registered words stored in a speech recognition word database, which defines a vocabulary for speech recognition and stores the vocabulary for speech recognition as the plurality of registered words;

a reference similarity calculation step of searching for a sequence having a highest similarity to the uttered speech, and calculating a reference similarity regarding the sequence, the sequence being a combination of acoustic units, which are subwords;

an unregistered word judgment step of judging whether the uttered speech is one of (i) a registered word of the plurality of registered words stored in the speech recognition word database, and (ii) an unregistered word not stored in the speech recognition word database, said unregistered word judgment step performing the judgment by comparing a similarity between the plurality of registered words checked against the uttered speech in said speech recognition step and the uttered speech with the reference similarity calculated in said reference similarity calculation step;

an unregistered word candidate search step of searching, from among a plurality of unregistered words stored in an unregistered word database, for an unregistered word candidate likely to correspond to the uttered speech, based on the uttered speech, said unregistered word candidate search step performing the search when said unregistered word judgment step judges that the uttered speech is an unregistered word; and a result display step of displaying a result of the search performed by said unregistered word candidate search step together with an indication that the uttered speech is an unregistered word.

18. A speech recognition method for recognizing uttered speech and presenting a result of the recognition of the uttered speech, the speech recognition method comprising:

a speech recognition step of checking the uttered speech against a plurality of registered words stored in a speech recognition word database which defines a vocabulary for speech recognition and stores the vocabulary for speech recognition as the plurality of registered words;

a reference similarity calculation step of searching for a sequence having a highest similarity to the uttered speech, and calculating a reference similarity regarding the sequence, the sequence being a combination of acoustic units, which are subwords;

an unregistered word judgment step of judging whether the uttered speech is one of (i) a registered word of the plurality of registered words stored in the speech recognition word database, and (ii) an unregistered word not stored in the speech recognition word database, said unregistered word judgment step performing the judgment by comparing a similarity between the plurality of registered words checked against the uttered speech in said speech recognition step and the uttered speech with the reference similarity calculated in said reference similarity calculation step;

an unregistered word candidate search step of searching, from among a plurality of unregistered words stored in an unregistered word database, for an unregistered word candidate likely to correspond to the uttered speech, based on the uttered speech, said unregistered word candidate search step performing the search when said unregistered word judgment step judges that the uttered speech is an unregistered word; and a result display step of displaying a result of the search performed by said unregistered word candidate search step together with an indication that the uttered speech is an unregistered word.

* * * * *